(12) United States Patent
Lin et al.

(10) Patent No.: US 11,829,207 B2
(45) Date of Patent: Nov. 28, 2023

(54) HINGE AND AN ELECTRONIC DEVICE WITH THE SAME

(71) Applicant: FOSITEK CORPORATION, New Taipei (TW)

(72) Inventors: Chun-Han Lin, New Taipei (TW); Yung-Chih Tseng, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 121 days.

(21) Appl. No.: 17/577,812

(22) Filed: Jan. 18, 2022

(65) Prior Publication Data
US 2023/0123808 A1    Apr. 20, 2023

(30) Foreign Application Priority Data
Oct. 19, 2021   (TW) ................................. 110138670

(51) Int. Cl.
| G06F 1/16 | (2006.01) |
|---|---|
| F16C 11/04 | (2006.01) |
| E05D 11/06 | (2006.01) |
| E05D 3/16 | (2006.01) |

(52) U.S. Cl.
CPC ............ *G06F 1/1681* (2013.01); *F16C 11/04* (2013.01); *E05D 3/16* (2013.01); *E05D 11/06* (2013.01); *E05Y 2900/606* (2013.01)

(58) Field of Classification Search
CPC .............................. G06F 1/1681; E05D 11/06
See application file for complete search history.

(56) References Cited

U.S. PATENT DOCUMENTS

| 10,036,188 B1 * | 7/2018 | Yao | G06F 1/1681 |
|---|---|---|---|
| 2021/0055764 A1 * | 2/2021 | Chi | G06F 1/1647 |
| 2023/0205276 A1 * | 6/2023 | Oh | H01Q 1/2266 |
| | | | 361/679.02 |

* cited by examiner

*Primary Examiner* — Anthony Q Edwards
(74) *Attorney, Agent, or Firm* — Birch, Stewart, Kolasch & Birch, LLP

(57) ABSTRACT

A hinge includes a base frame, a support frame and a transmitting mechanism. The base frame includes front and rear ends. The transmitting mechanism includes a first sliding plate, a second sliding plate and a transmitting assembly. The first and second sliding plates are connected with and slidable relative to the base frame in a front-rear direction. The transmitting assembly includes a rotating axle unit and a linkage unit. The rotating axle unit is movable with the support frame to cause sliding movements of the first and second sliding plates and a pivoting of the linkage unit relative to the base frame so as to shift the first and second sliding plates between retracted and projecting states.

20 Claims, 29 Drawing Sheets

HINGE AND AN ELECTRONIC DEVICE WITH THE SAME

CROSS-REFERENCE TO RELATED APPLICATION

This application claims priority of Taiwanese Patent Application No. 110138670, filed on Oct. 19, 2021.

FIELD

The disclosure relates to a hinge, and more particularly to a hinge for an electronic device, and an electronic device with such hinge.

BACKGROUND

A conventional electronic device, such as a portable computer, includes first and second housings which are connected with each other by means of a hinge, such that the second housing with a display screen mounted thereon is rotated relative to the first housing with a host computer mounted therein. When the second housing is opened, the bottom of the second housing conceals and blocks heat dissipating holes formed in a rear side of the first housing and hence adversely affects heat dissipation thereof. Moreover, the rear side of the first housing also conceals the bottom of the second housing, which narrows the display range of the second housing.

SUMMARY

Therefore, an object of the disclosure is to provide a hinge and an electronic device that can alleviate at least one of the drawbacks of the prior art.

According to the disclosure, the hinge includes a base frame, a support frame and a transmitting mechanism. The base frame includes front and rear ends opposite to each other in a front-rear direction. The transmitting mechanism includes a first sliding plate, a second sliding plate and a transmitting assembly. The first sliding plate is connected with and slidable relative to the base frame in the front-rear direction. The second sliding plate is connected with and slidable relative to the base frame in the front-rear direction, and is aligned with the first sliding plate in a left-right direction. The transmitting assembly includes a rotating axle unit which is non-rotatably connected with the support frame and which is rotatably connected with both the first sliding plate and the second sliding plate respectively about a first rotating axis and a second rotating axis that are parallel to each other in the left-right direction and offset from each other in the front-rear direction, and a linkage unit which is pivotably connected to the base frame about a pivot axis and which is rotatably connected with both the first sliding plate and the second sliding plate. The rotating axle unit is disposed to be moved with the support frame to cause sliding movements of the first and second sliding plates relative to each other, and a pivoting of the linkage unit about the pivot axis relative to the base frame such that the first sliding plate and the second sliding plate are shiftable between a retracted state, where the first and second sliding plates are superimposed upon each other and disposed within the base frame to have the support frame be close to the rear end of the base frame, and a projecting state, where the first and second sliding plates project from the rear end of the base frame to have the support frame be remote from the rear end.

According to the disclosure, the electronic device includes a first housing, a second housing and a hinge. The first housing has a plurality of rear heat dissipating holes. The hinge includes a base frame, a support frame and a transmitting mechanism. The base frame is connected to the first housing. The support frame is connected to the second housing. In the retracted state, the second housing is disposed in a closed position to cover the first housing. In the projecting state, the second housing is disposed in an opened position to be remote from the rear heat dissipating holes.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
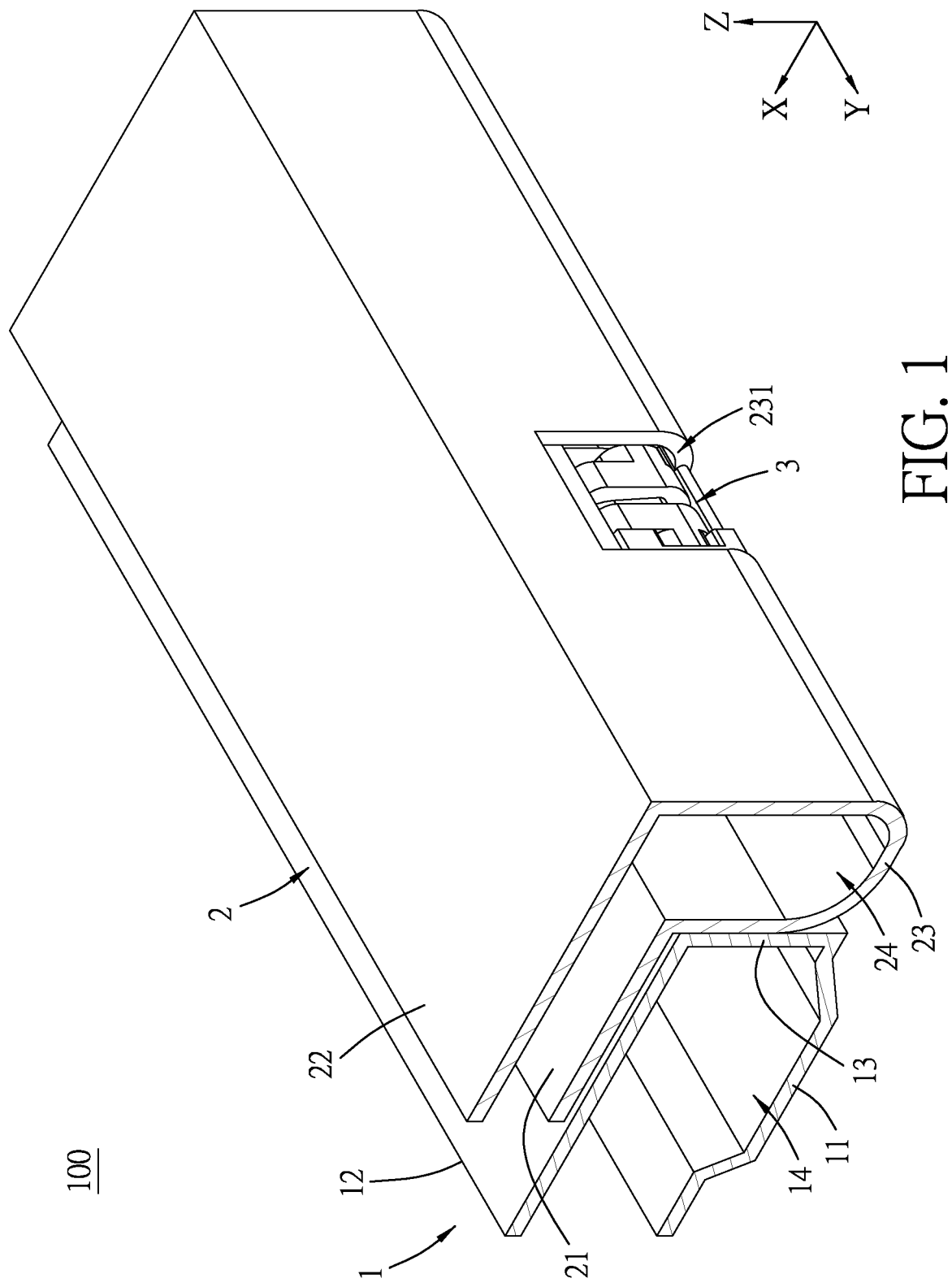
FIG. 1 is a fragmentary perspective view illustrating one embodiment of an electronic device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
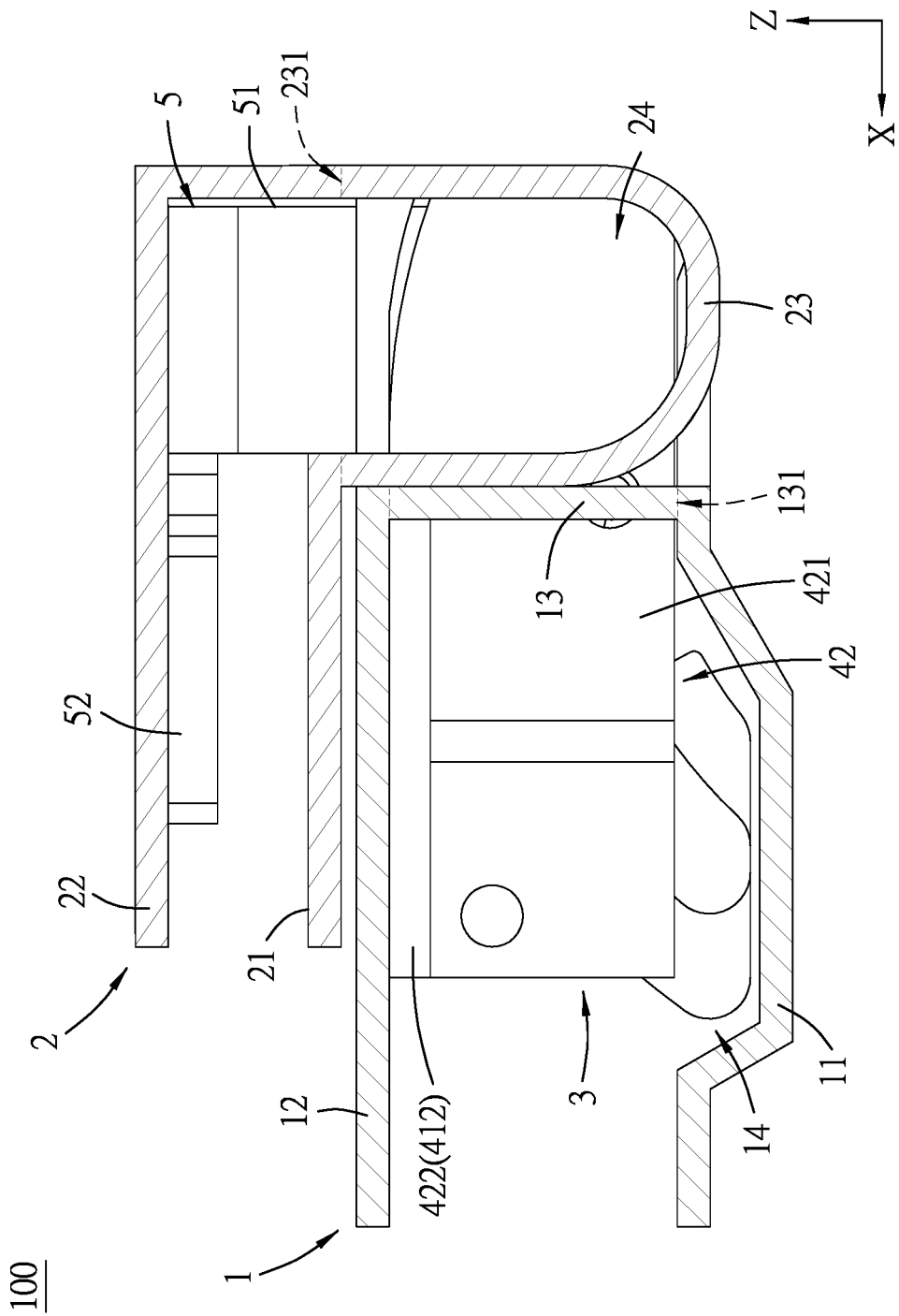
FIG. 2 is a partly sectioned side view of FIG. 1, illustrating a second housing is in a closed position.
Figure 3:
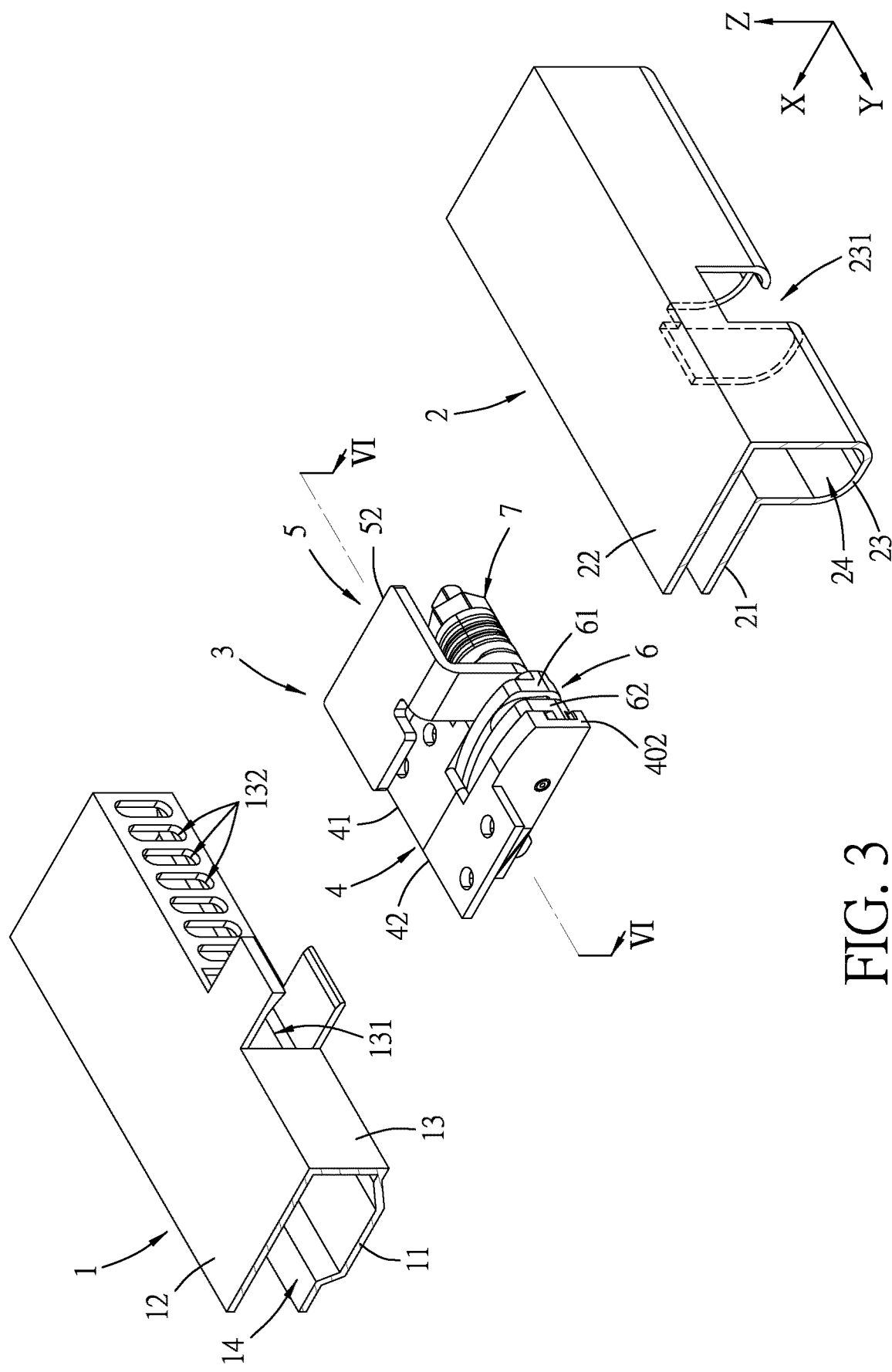
FIG. 3 is a fragmentary, exploded perspective view of the embodiment.

Referring to FIGS. 1 to 3, an embodiment of an electronic device 100 according to the disclosure includes a first housing 1, a second housing 2 and a hinge 3 disposed between the first and second housings 1, 2. In this embodiment, the electronic device 100 is a portable computer. The electronic device 100 may be a foldable phone, a foldable laptop, a foldable ebook, or any other foldable electronic device. The electronic device 100 may include a plurality of hinges 3.

The first housing 1 may have a host computer mounted therein, and includes a bottom wall 11, a top wall 12 disposed above the bottom wall 11, and a rear wall 13 interconnecting rear ends of the bottom and top walls 11, 12 so as to cooperatively define a receiving space 14 therein for receiving a mainboard, hard drive and other electronic component parts. The rear wall 13 is formed with a rear opening 131 in communication with the receiving space 14, and a plurality of rear heat dissipating holes 132 arranged and spaced apart from one another in a left-right direction (Y) and in communication with the receiving space 14.

Figure 15:
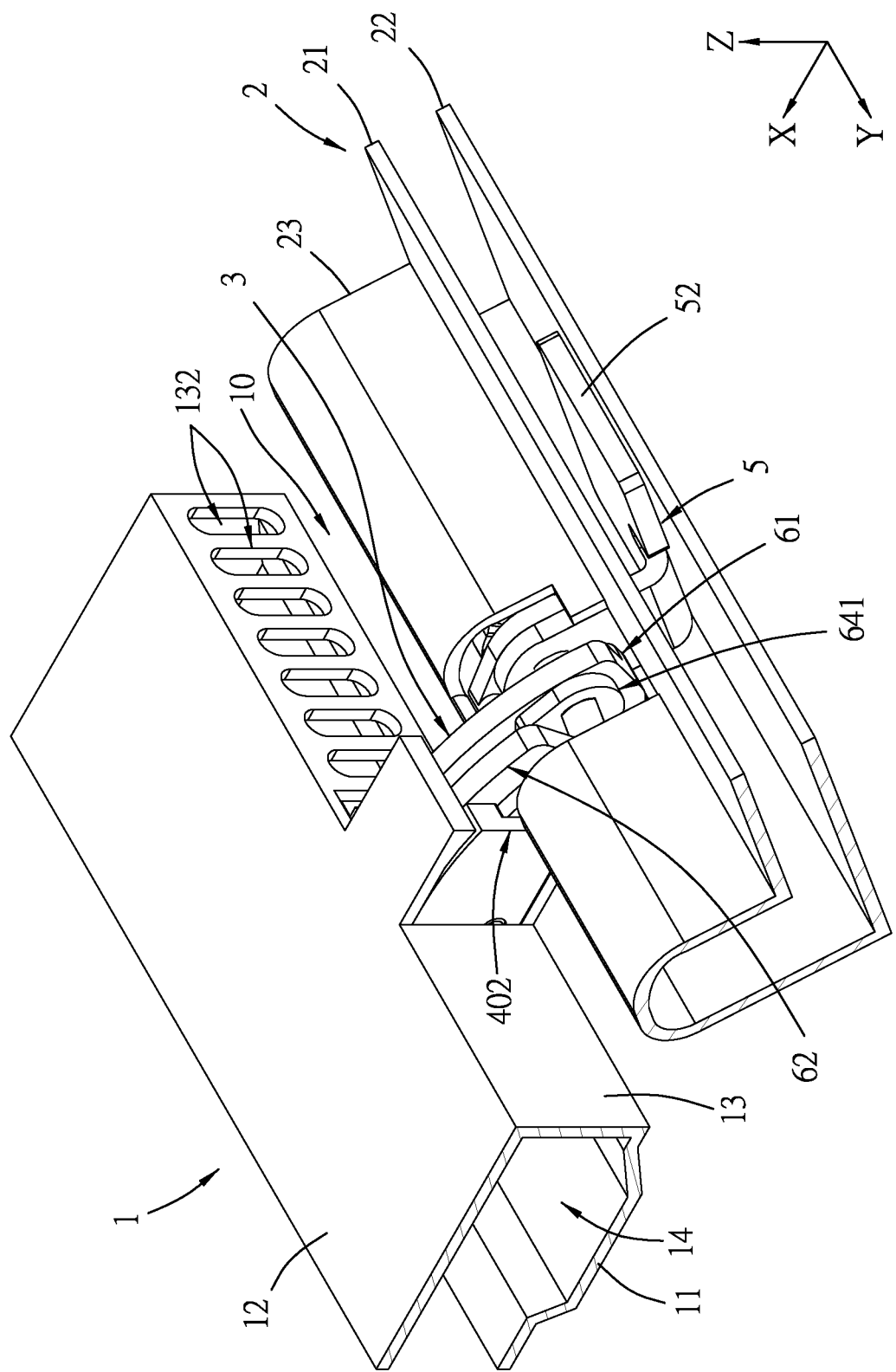
FIG. 15 is a fragmentary perspective view illustrating that the second housing is in an opened position.

The second housing 2 has a display screen mounted thereon, and includes an inner wall 21, an outer wall 22 disposed above the inner wall 21, and a connecting wall 23 interconnecting rear ends of the inner and outer walls 21, 22. The connecting wall 23 has a U-shaped cross-section and cooperates with the inner and outer walls 21, 22 to define a receiving space 24. The connecting wall 23 is formed with an opening 231 in communication with the receiving space 24. The second housing 2 is rotatable relative to the first housing 1 through the hinge 3 between a closed position (as shown in FIG. 1) and an opened position (as shown in FIG. 15).

Figure 4:
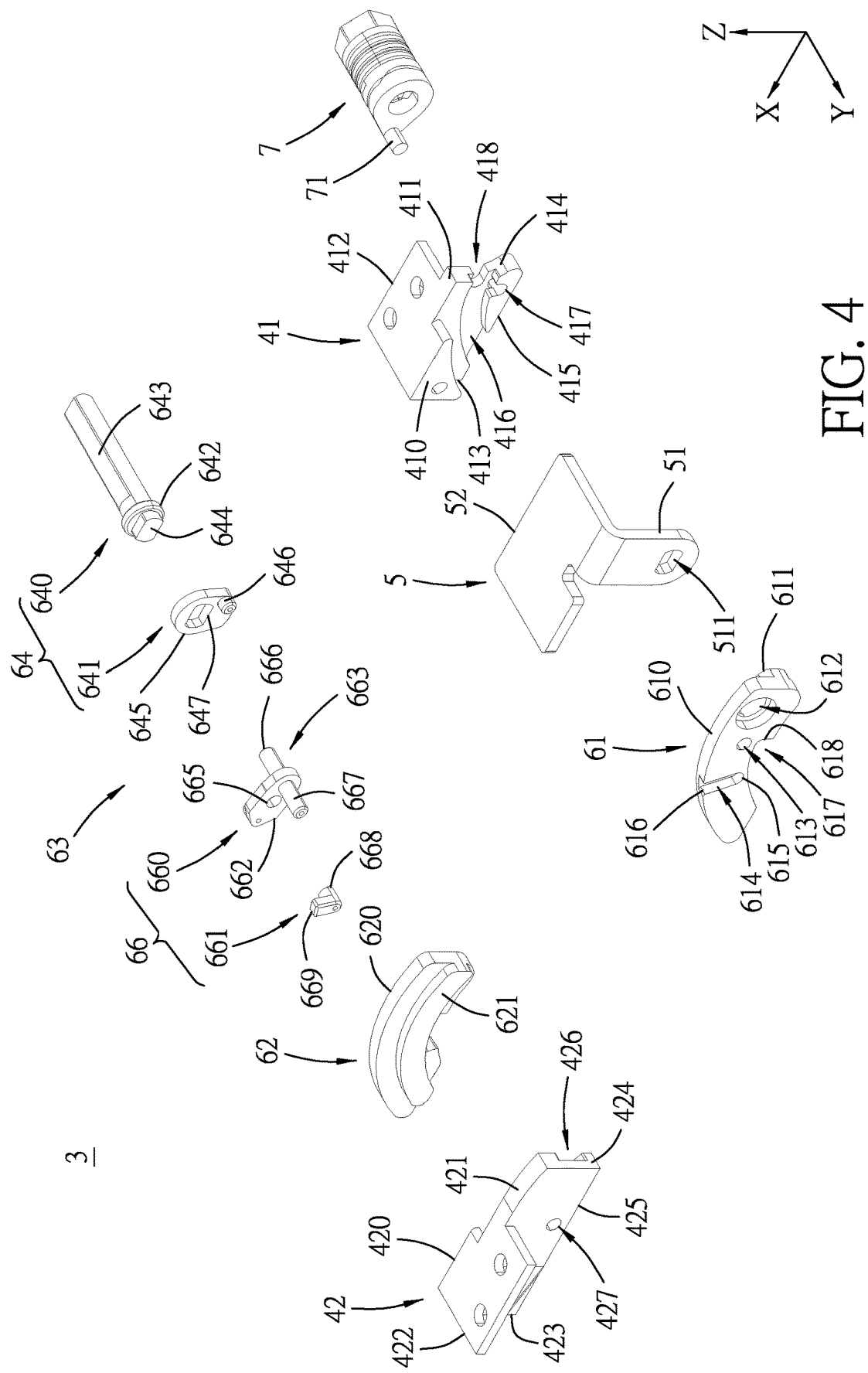
FIG. 4 is an exploded perspective view illustrating one embodiment of a hinge.

With reference to FIGS. 2 to 4, the hinge 3 includes a base frame 4, a support frame 5, a transmitting mechanism 6 and a frictional torque module 7. The base frame 4 includes a first frame body 41 and a second frame body 42. The first frame body 41 has an upright first side wall 411 and a first connecting wall 412. The first side wall 411 is disposed in the receiving space 14, the rear opening 131, the opening 231 and the receiving space 24. The first side wall 411 has a front face 413, a rear face 414 opposite to the front face 413 in a front-rear direction (X) which is perpendicular to the left-right direction (Y), and a bottom face 415 interconnecting the front and rear faces 413, 414.

Figure 5:
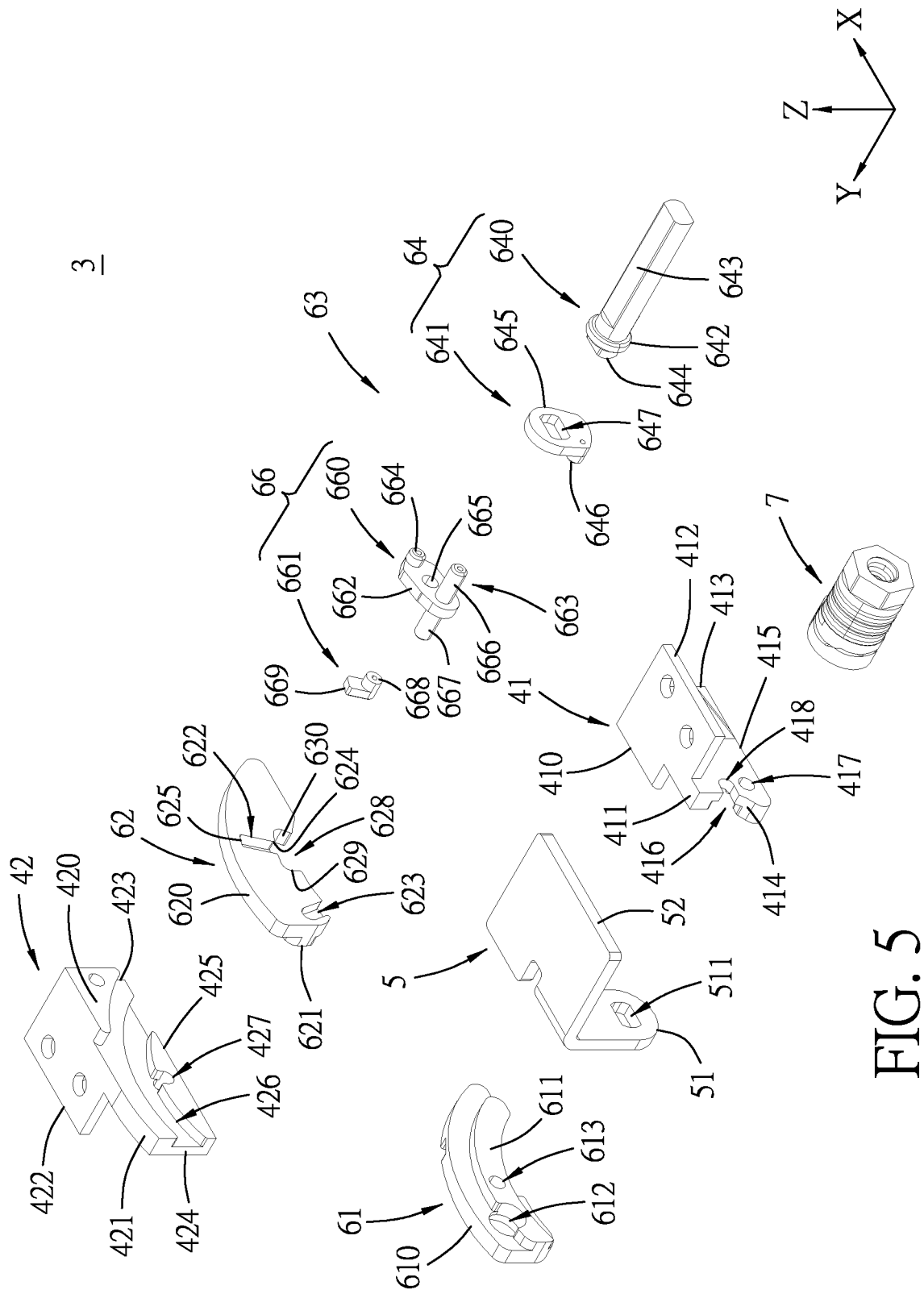
FIG. 5 is an exploded perspective view of the hinge taken from another angle.
Figure 7:
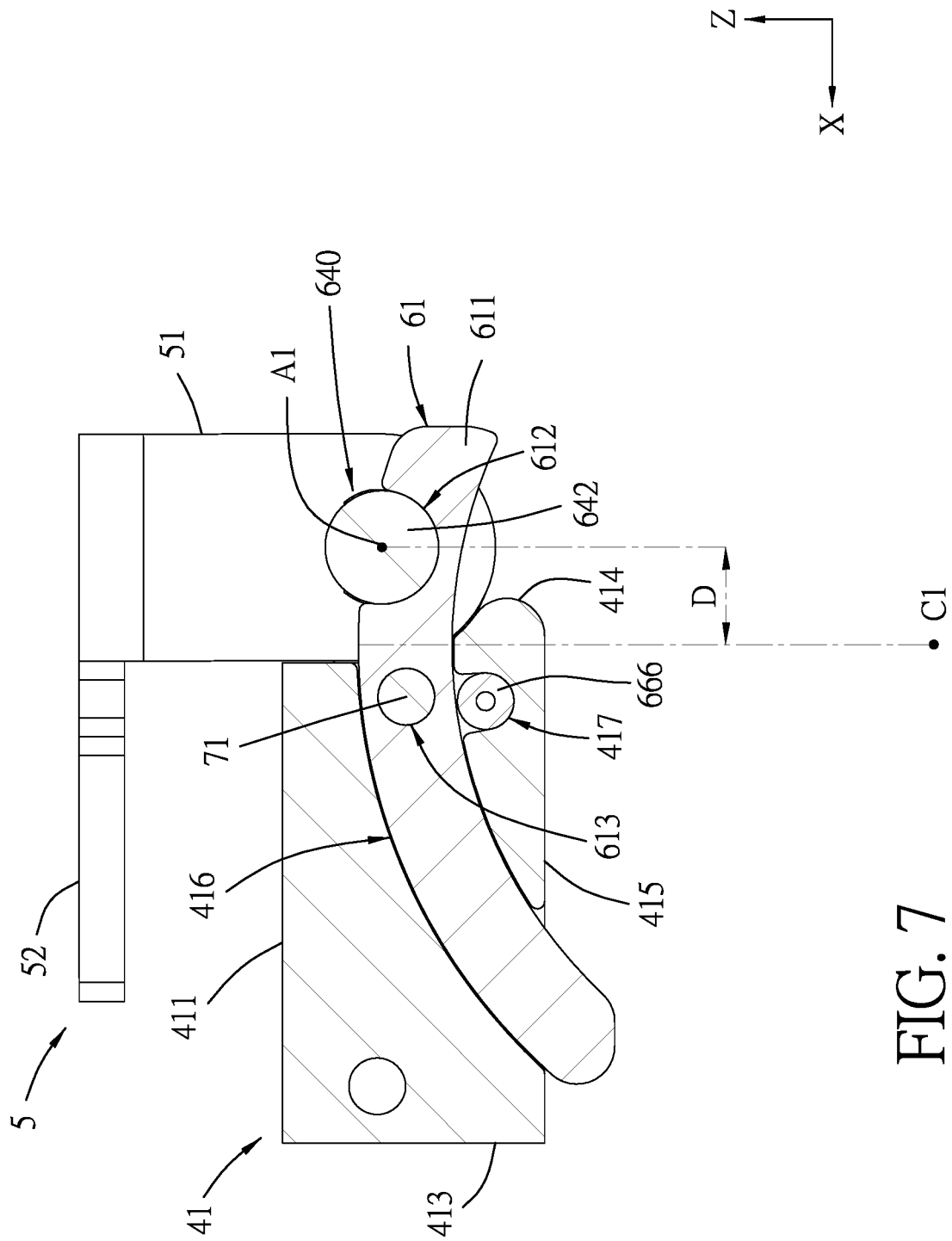
FIG. 7 is a sectional view taken along line VII-VII of FIG. 6.

With reference to FIGS. 4, 5 and 7, the first side wall 411 has a first arcuate slot 416 recessed in a left face thereof and extending between the bottom face 415 and the rear face 414. The first arcuate slot 416 is arcuated about a center (C1) which is below the bottom face 415 in an up-down direction (Z) that is perpendicular to both the front-rear direction (X) and the left-right direction (Y). The left face of the first side wall 411 has a first pivot hole 417 formed adjacent to the rear face 414 and at a lower end of the first arcuate slot 416. The first side wall 411 has a through hole 418 formed through a right face thereof and extending to the rear face 414 and in communication with the first arcuate slot 416. The first frame body 41 further has a first protrusion 410 formed on the left face of the first side wall 411. The first connecting wall 412 extends rightwardly from an upper end of the first side wall 411. The first connecting wall 412 is received in the receiving space 14 (as shown in FIG. 2) and fastened to the top wall 12 of the first housing 1 by means of screws (not shown).

With reference to FIGS. 2, 4 and 5, the second frame body 42 is aligned with the first frame body 41 in the left-right direction (Y) and at the left side of the first frame body 41, and has an upright second side wall 421 and a second connecting wall 422. The second side wall 421 is disposed in the receiving space 14, the rear opening 131, the opening 231 and the receiving space 24. The second side wall 421 has a front face 423, a rear face 424 opposite to the front face 423, and a bottom face 425 interconnecting the front and rear faces 423, 424.

With reference to FIGS. 4, 5, 6 and 8, the second side wall 421 has a second arcuate slot 426 recessed in a right face thereof and extending between the bottom face 425 and the rear face 424. The second arcuate slot 426 is arcuated about a center (C2) which is below the bottom face 425 in the up-down direction (Z) and aligned with the center (C1) (see FIG. 7) in the left-right direction. The second side wall 421 has a second pivot hole 427 formed at a lower end of the second arcuate slot 426. The second frame body 42 further has a second protrusion 420 formed on a right face of the second side wall 421 and abutting against the first protrusion 410. The second side wall 421, the second protrusion 420, the first side wall 411 and the first protrusion 410 are secured to each other by means of screw fasteners. The second connecting wall 422 extends leftwardly from an upper end of the second side wall 421. The second connecting wall 422 is received in the receiving space 14 (as shown in FIG. 2) and fastened to the top wall 12 of the first housing 1 by means of screws (not shown). As such, the front faces 413, 423 of the first and second frame bodies 41, 42 cooperatively serve as a front end 401 of the base frame 4, and the rear faces 414, 424 of the first and second frame bodies 41, 42 cooperatively serve as a rear end 402 of the base frame 4.

With reference to FIGS. 2, 4 and 7, the support frame 5 is disposed in the receiving space 24, and includes an upright plate 51 and a transverse plate 52 extending from an upper end of the upright plate 51. The upright plate 51 abuts against the rear face 414 of the first frame body 41 and is formed with a non-circular hole 511. The transverse plate 52 is secured to the outer wall 22 of the second housing 2 by means of screw fasteners.

With reference to FIGS. 4, 5, 6, 7 and 9, the transmitting mechanism 6 includes a first sliding plate 61, a second sliding plate 62 and a transmitting assembly 63. The first sliding plate 61 is an arcuate plate, and has a first plate body 610 and a first sliding protrusion 611 projecting from a right face of the first plate body 610. The first sliding plate 61 has a pivot hole 612 which extends therethrough in the left-right direction (Y) and which is aligned with the non-circular hole 511 of the support frame 5, and a mounting hole 613 which is formed forwardly of the pivot hole 612 and aligned with the through hole 418 of the first frame body 41. The pivot hole 612 is proximate to a rear end of the first sliding plate 61. The first plate body 610 has a guiding slot 614 which is recessed from a left face thereof and formed forwardly of the mounting hole 613. The guiding slot 614 extends from a lower end thereof and is inclined upwardly and forwardly to an upper end thereof to have a lower end portion 615 and an upper end portion 616. The first plate body 610 further has a first notch 617 in a lower end thereof which extends in the front-rear direction (X) to terminate at a rear stop face 618. The first sliding protrusion 611 is configured to be fittingly and slidably engaged in the first arcuate slot 416 such that the first sliding plate 61 is slidable relative to the first frame body 41 in the front-rear direction (X).

With reference to FIGS. 4, 5, 6, 8 and 10, the second sliding plate 62 is disposed at a left side of the first sliding plate 61 and is aligned with the first sliding plate 61 in the left-right direction (Y). The second sliding plate 62 is an arcuate plate, and has a second plate body 620 and a second sliding protrusion 621 projecting from a left face of the second plate body 620. The second plate body 620 has a front slot 622 and a rear slot 623 which are recessed from a right face thereof and opposite to each other in the front-rear direction (X). The front slot 622 extends from a lower end of the second plate body 620 and is inclined upwardly and forwardly to have a lower end portion 624 and an upper end portion 625. The rear slot 623 extends from the lower end of the second plate body 620 and is inclined upwardly and rearwardly to have a lower end portion 626 and an upper end portion 627. The second plate body 620 further has a second notch 628 in the lower end thereof which is in communication with the front slot 622 and extends in the front-rear direction (X) to terminate at a rear stop face 629 and a front stop face 630. The second sliding protrusion 621 is configured to be fittingly and slidably engaged in the second arcuate slot 426 such that the second sliding plate 62 is slidable relative to the second frame body 42 in the front-rear direction (X).

With reference to FIGS. 3, 4, 5 and 6, the transmitting assembly 63 includes a rotating axle unit 64 which is non-rotatably connected with the support frame 5 and rotatably connected with both the first sliding plate 61 and the second sliding plate 62 respectively about a first rotating axis (A1) and a second rotating axis (A2) that are parallel to each other in the left-right direction (Y) and offset from each other in the front-rear direction (X), and a linkage unit 66 which is pivotably connected to the base frame 4 about a pivot axis (S1) and rotatably connected with both the first sliding plate 61 and the second sliding plate 62. The rotating axle unit 64 is disposed to be moved with the support frame 5 to cause sliding movements of the first and second sliding plates 61, 62 relative to each other, and a pivoting of the linkage unit 66 about the pivot axis (S1) relative to the base frame 4 such that the first sliding plate 61 and the second sliding plate 62 are shiftable between a retracted state (as shown in FIG. 3), where the first and second sliding plates 61, 62 are superimposed upon each other and disposed within the base frame 4 to have the support frame 5 be close to the rear end 402 of the base frame 4, and a projecting state (as shown in FIG. 15), where the first and second sliding plates 61, 62 project from the rear end 402 of the base frame 4 to have the support frame 5 be remote from the rear end 402.

With reference to FIGS. 4, 6, 9 and 11, in this embodiment, the rotating axle unit 64 is disposed to define the relative sliding movement of the first and second sliding plates 61, 62. Specifically, the rotating axle unit 64 includes a rotating axle 640 and a crank 641. The rotating axle 640 extends along the first rotating axis (A1). The rotating axle 640 has a pivot section 642, a first spline section 643 formed at a right side of the pivot section 642, and a second spline section 644 formed at a left side of the pivot section 642. The pivot section 642 is rotatably engaged with the pivot hole 612 of the first sliding plate 61. The first spline section 643 has a non-circular cross-section, and is in spline engagement with the non-circular hole 511 of the support frame 5 and projects rightwardly of the upright plate 51. The second spline section 644 has a non-circular cross-section.

With reference to FIGS. 4, 6, 10 and 11, the crank 641 has a connecting plate 645 and an actuating pin 646. The connecting plate 645 is interposed between the first plate body 610 of the first sliding plate 61 and the second plate body 620 of the second sliding plate 62, and has a non-circular hole 647. The second spline section 644 is in spline engagement with the non-circular hole 647 to be non-rotatably connected with the rotating axle 640. The actuating pin 646 projects from a left side of the connecting plate 645 and is spaced apart from the non-circular hole 647. The actuating pin 646 extends along the second rotating axis (A2) and is rotatably and movably engaged in the rear slot 623. As such, the second rotating axis (A2) is parallel to and offset from the first rotating axis (A1). Thus, the support frame 5 and the rotating axle unit 64 are rotatable about the first rotating axis (A1) relative to the first sliding plate 61, and the rotating axle unit 64 is rotatable about the second rotating axis (A2) relative to the second sliding plate 62 so as to cause the sliding movements of the first and second sliding plates 61, 62 relative to each other.

With reference to FIGS. 5, 8, 9 and 10, the linkage unit 66 is disposed to define the arcuate sliding movements of the first and second sliding plates 61, 62 along the first and second arcuate slots 416, 426, respectively. Specifically, the linkage unit 66 includes a linkage plate 660 and an axle shaft 661. The linkage plate 660 has a linking body 662, a pivot pin 663 disposed on an end portion of the linking body 662, and a first connecting pin 664 disposed on an opposite end portion of the linking body 662. The linking body 662 is interposed between the first and second plate bodies 610, 620, and has a circular mounting hole 665 formed between the pivot pin 663 and the first connecting pin 664. The pivot pin 663 extends along the pivot axis (S1) and has a first pivot section 666 at a right side of the linking body 662, and a second pivot section 667 at a left side of the linking body 662. The first pivot section 666 extends through the first notch 617 of the first sliding plate 61 and is rotatably connected with the first pivot hole 417 of the first frame body 41. The first pivot section 666 is disposed to engage with the rear stop face 618 to stop a forward sliding movement of the first sliding plate 61. The second pivot section 667 extends through the second notch 628 of the second sliding plate 62 and is rotatably connected with the second pivot hole 427 of the second frame body 42. The second pivot section 667 is disposed to engage with the rear stop face 629 to stop a forward sliding movement of the second sliding plate 62. The second pivot section 667 is also disposed to engage with the front stop face 630 to stop a rearward sliding movement of the second sliding plate 62. The first connecting pin 664 projects from the right side of the linking body 662. The first connecting pin 664 extends along a first connecting axis (S2) and is rotatably and movably connected with the guiding slot 614 of the first sliding plate 61.

Figure 10:
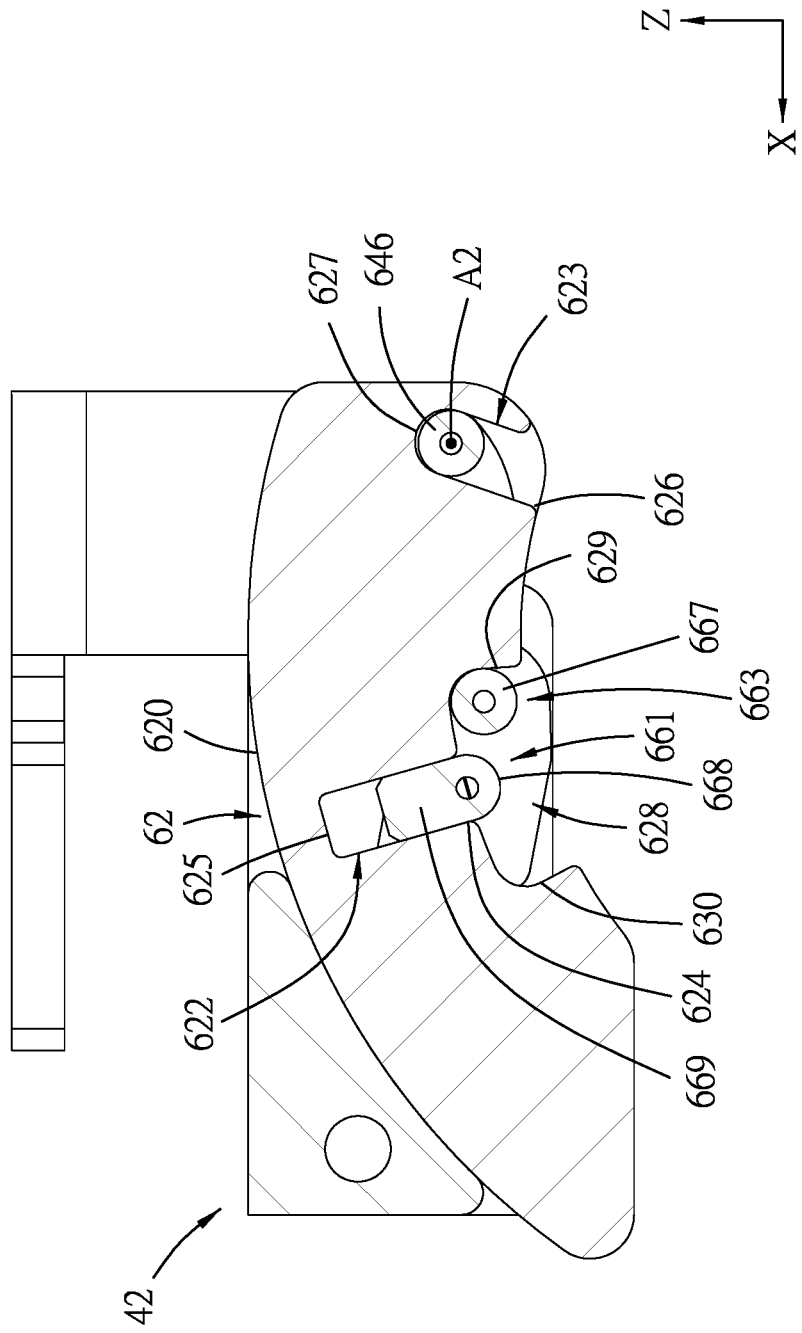
FIG. 10 is a sectional view taken along line X-X of FIG. 6.
Figure 11:
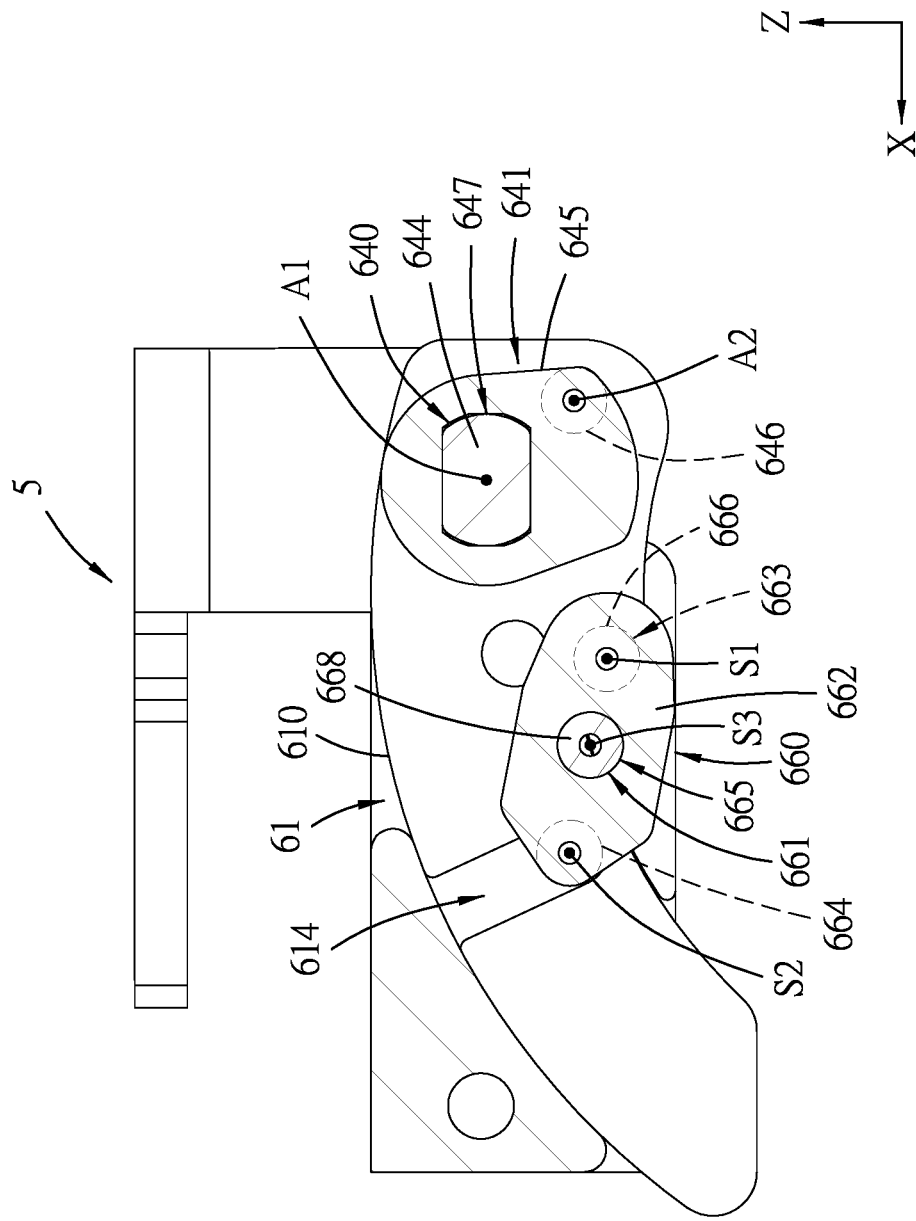
FIG. 11 is a sectional view taken along line XI-XI of FIG. 6.

With reference to FIGS. 5, 10 and 11, the axle shaft 661 has a second connecting pin 668 and a sliding block 669 extending radially and outwardly from an outer periphery of the second connecting pin 668. The second connecting pin 668 extends along a second connecting axis (S3). The second connecting pin 668 is rotatably engaged in the mounting hole 665 and is movably received in the front slot 622 of the second sliding plate 62. The sliding block 669 is movably received in the front slot 622. A distance between the pivot axis (S1) of the pivot pin 663 and the first connecting axis (S2) of the first connecting pin 664 is different from a distance between the pivot axis (S1) of the pivot pin 663 and the second connecting axis (S3) of the second connecting pin 668. Hence, the linkage unit 66 serves as a stroke amplifier mechanism to amplify the sliding movement of the first and second sliding plates 61, 62 relative to the base frame 4 (see FIG. 3). In this embodiment, each of the first and second connecting axes (S2, S3) is parallel to the pivot axis (S1), and the distance between the pivot axis (S1) and the first connecting axis (S2) is larger than the distance between the pivot axis (S1) and the second connecting axis (S3). Thus, the linkage unit 66 has a compact structure.

Figure 6:
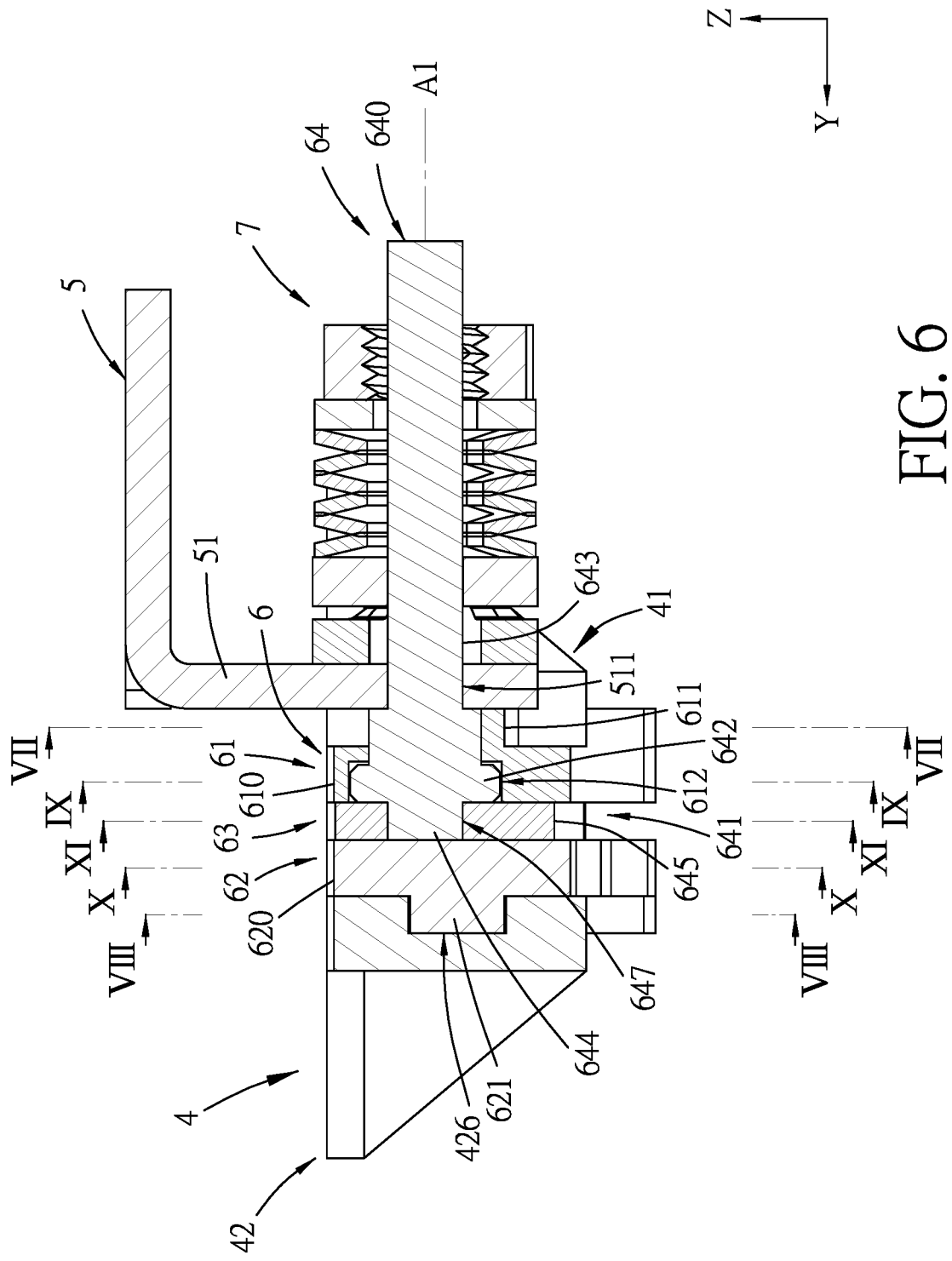
FIG. 6 is a sectional view taken along line VI-VI of FIG. 3.

With reference to FIGS. 4, 6 and 7, the frictional torque module 7 is sleeved around the first spline section 643 of the rotating axle 640 and has a positioning stud 71. The positioning stud 71 extends through the through hole 418 and is secured to the mounting hole 613 of the first sliding plate 61. When the support frame 5 and the rotating axle unit 64 are rotated about the first rotating axis (A1) relative to the first sliding plate 61, a frictional torque is generated through the frictional torque module 7 to retain the support frame 5 and the rotating axle unit 64 at a desired angular position.

Figure 8:
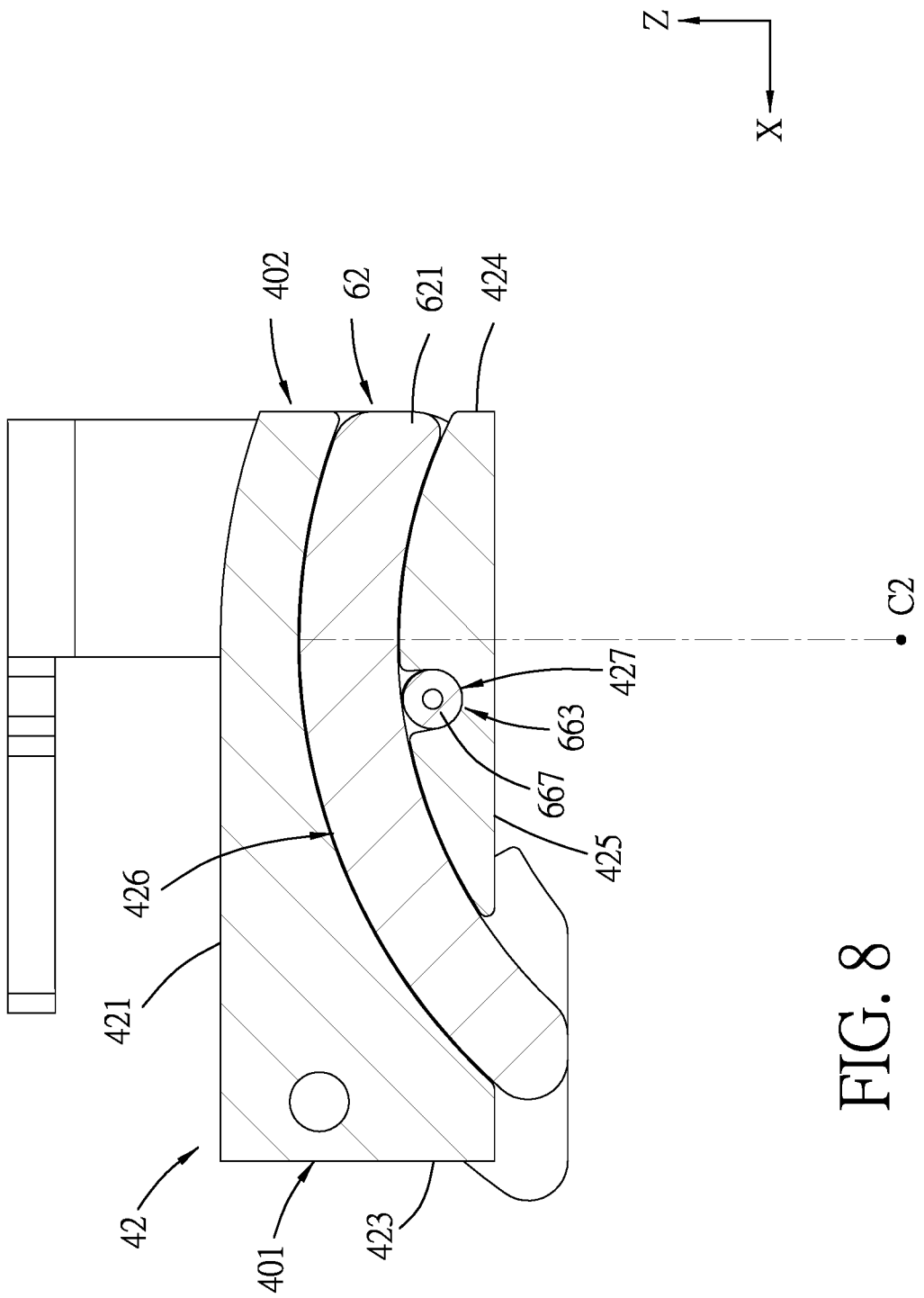
FIG. 8 is a sectional view taken along line VIII-VIII of FIG. 6.
Figure 9:
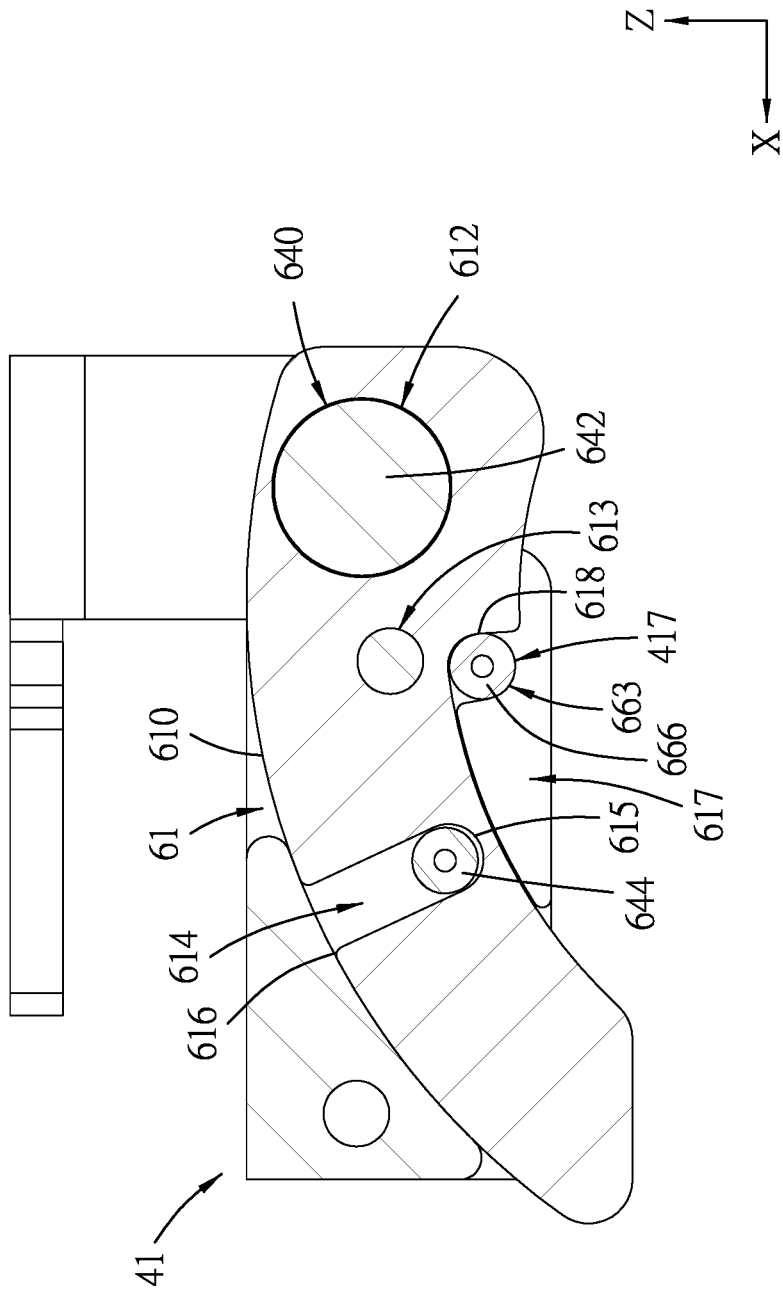
FIG. 9 is a sectional view taken along line IX-IX of FIG. 6.
Figure 12:
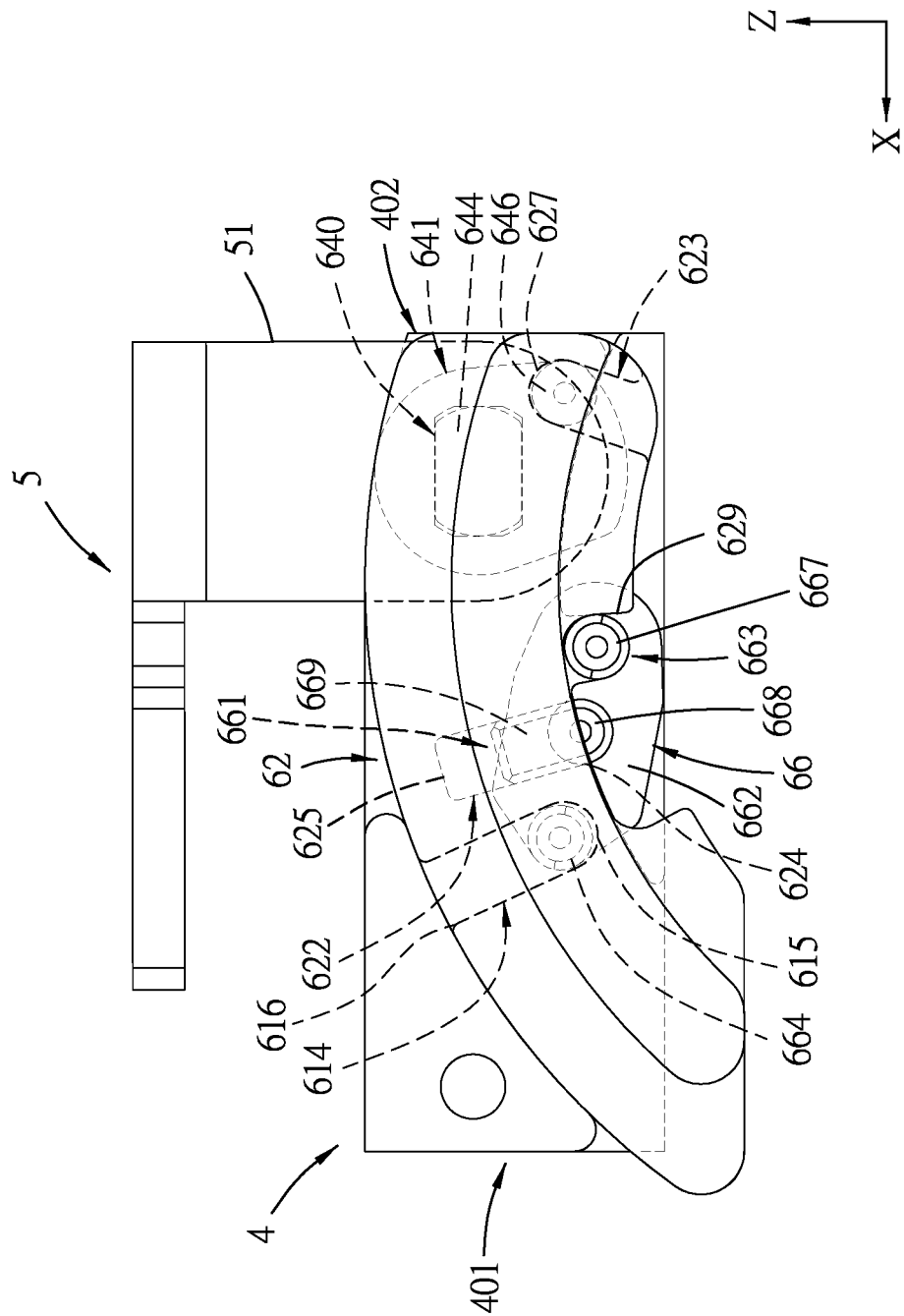
FIG. 12 is a schematic side view illustrating that a first sliding plate and a second sliding plate of the hinge are in a retracted state, a second frame being removed for the sake of clarity.

When the first sliding plate 61 and the second sliding plate 62 are in the retracted state, the structural relationships of the related component parts are described as follows:

1. Referring to FIGS. 3, 9 and 10, the rear stop face 618 of the first sliding plate 61 engages with and is stopped by the first pivot section 666. The rear stop face 629 of the second sliding plate 62 engages with and is stopped by the second pivot section 667 such that the first and second sliding plates 61, 62 are superimposed upon each other in the left-right direction (Y) and are disposed within the base frame 4.
2. Referring to FIGS. 10 and 12, the actuating pin 646 of the crank 641 is engaged in the upper end portion 627 of the rear slot 623.
3. Referring to FIGS. 7, 8 and 12, the rotating axle 640 is disposed forwardly and upwardly of the actuating pin 646. The first rotating axis (A1) of the rotating axle 640 is behind the center (C1) of the first arcuate slot 416 and the center (C2) of the second arcuate slot 426 in the front-rear direction (X). In this embodiment, the first rotating axis (A1) is distant from both the center (C1) and the center (C2) by a distance (D).
4. Referring to FIGS. 9, 11 and 12, the linking body 662 is tilted. The second connecting pin 668 is engaged in the lower end portion 624 of the front slot 622 and is disposed forwardly and upwardly of the pivot pin 663. The first connecting pin 664 is engaged in the lower end portion 615 of the guiding slot 614 and is disposed forwardly and upwardly of the second connecting pin 668.
5. Referring to FIGS. 7 and 12, the upright plate 51 of the support frame 5 abuts against and is stopped by the rear face 414 of the first frame body 41, and is disposed close to and forwardly of the rear end 402 of the base frame 4.
6. Referring to FIGS. 2 and 3, the second housing 2 is in a closed position where the inner wall 21 and the outer wall 22 of the second housing 2 cover the top wall 12 of the first housing 1, and the connecting wall 23 abuts against the rear wall 13 and conceals the rear heat dissipating holes 132.

Figure 13:
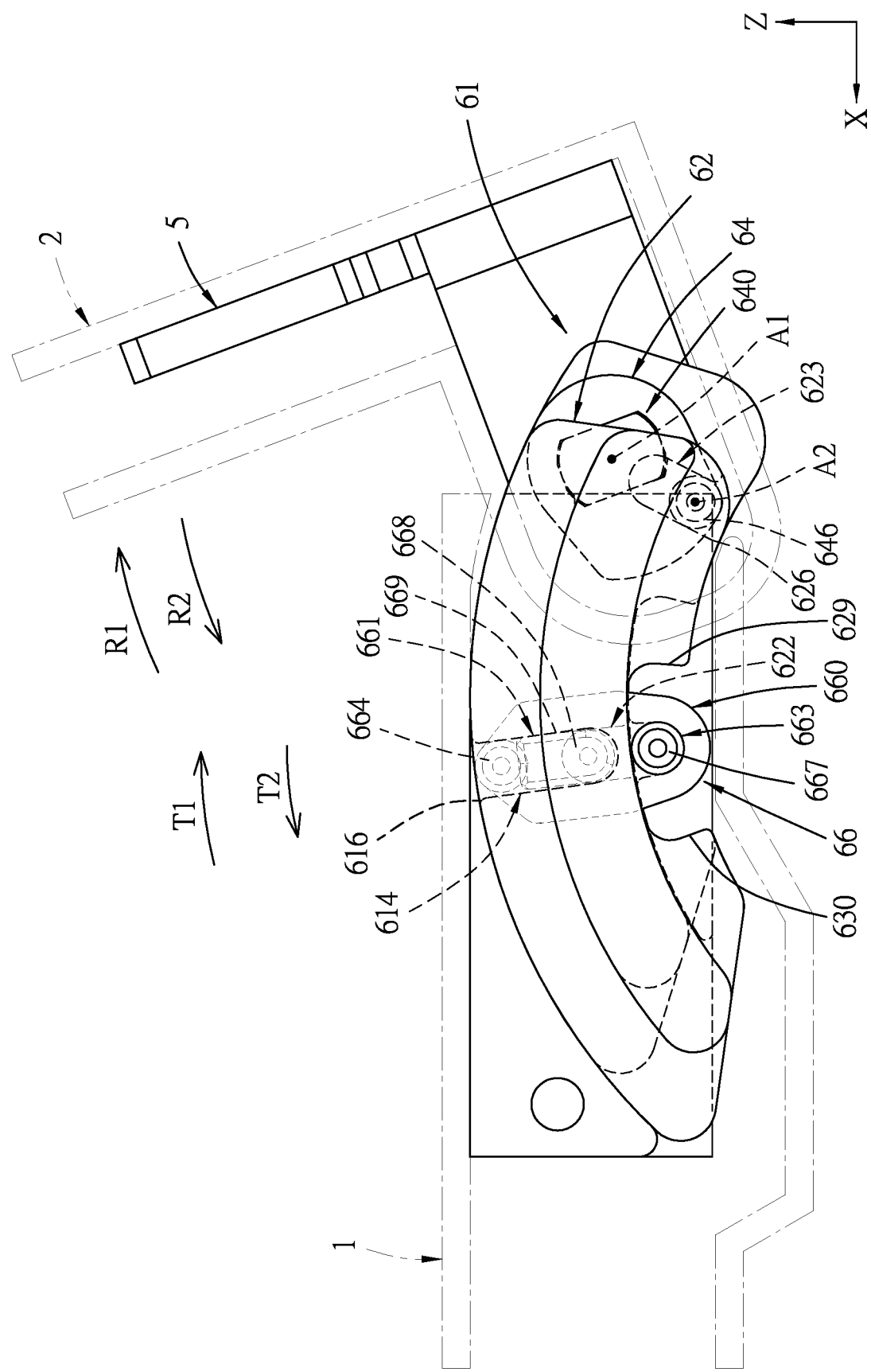
FIG. 13 is a schematic side view illustrating a state when the second housing is rotated relative to a first housing, the second frame being removed.

With reference to FIGS. 12 and 13, when it is desired to turn the second housing 2 from the closed position to the opened position, the second housing 2 is rotated in a first rotational direction (R1). During the rotation of the second housing 2, the support frame 5 and the rotating axle unit 64 are rotated about the first rotating axis (A1) relative to the first sliding plate 61. With the stop of the forward movements of the first and second sliding plates 61, 62 by the pivot pin 663, and the actuating pin 646 received in the rear slot 623, during the rotation of the rotating axle unit 64 about the first rotating axis (A1), the actuating pin 646 is rotated about the second rotating axis (A2) relative to the second sliding plate 62 and at the same time moved downwardly toward the lower end portion 626 of the rear slot 623 such that the rotating axle 640 is rotated about the actuating pin 646. Thus, the rotating axle unit 64 actuates the sliding movements of the first and second sliding plates 61, 62 relative to each other. During the relative sliding movements of the first and second sliding plates 61, 62, the first and second sliding plates 61, 62 bring about the pivoting of the linkage unit 66 relative to the base frame 4. With the angular displacement of the linkage unit 66, the first and second sliding plates 61, 62 are moved rearwardly along the first arcuate slot 416 (as shown in FIG. 7) and the second arcuate slot 426 (as shown in FIG. 8), respectively.

With reference to FIGS. 7, 8 and 13, since, in the retracted state, the first rotating axis (A1) is behind and distant from the centers (C1, C2) by the distance (D), the first and second sliding plates 61, 62 are moved downwardly during the rearward sliding movement thereof. Thus, the first rotating axis (A1) of the rotating axle 640 is moved rearwardly and downwardly. In other embodiments, the first rotating axis (A1) may be above the centers (C1, C2) to be moved rearwardly and downwardly.

With reference to FIGS. 11, 12 and 13, with the first connecting pin 664 and the axle shaft 661 respectively received in the guiding slot 614 of the first sliding plate 61 and the front slot 622 of the second sliding plate 62, the first and second sliding plates 61, 62 transmit a torque (T1) to the first connecting pin 664 and the axle shaft 661 during the rearward and downward sliding movements, to move the first connecting pin 664 and the axle shaft 661 toward the upper end portion 616 of the guiding slot 614 and the upper end portion 625 of the front slot 622, respectively, so as to bring about the pivoting of the pivot pin 663 of the linkage unit 66 relative to the base frame 4. During the pivoting of the linkage unit 66 relative to the base frame 4, the sliding strokes of the first and second sliding plates 61, 62 are amplified so as to project the first and second sliding plates 61, 62 rearwardly and outwardly of the rear end 402 of the base frame 4.

The second connecting pin 668 is interposed between the pivot pin 663 and the first connecting pin 664 in the front-rear direction (X). That is, the distance between the pivot axis (S1) and the first connecting axis (S2) is larger than the distance between the pivot axis (S1) and the second connecting axis (S3). The sliding movement of the first sliding plate 61 amplified by the linkage unit 66 is longer than that of the second sliding plate 62. Thus, during the rearward projection of the first and second sliding plates 61, 62 from the rear end 402, the first sliding plate 61 further projects from a rear end of the second sliding plate 62.

When the first sliding plate 61 slides relative to the second sliding plate 62 to bring the actuating pin 646 to rotate to an angular position as shown in FIG. 13, the actuating pin 646 is moved to the lower end portion 626 of the rear slot 623, the first connecting pin 664 is moved to the upper end portion 616 of the guiding slot 614, the axle shaft 661 is moved to the upper end portion 625 of the front slot 622, the rear stop face 629 is moved away from the second pivot section 667 of the pivot pin 663, and the front stop face 630 is moved closer to the second pivot section 667.

Figure 14:
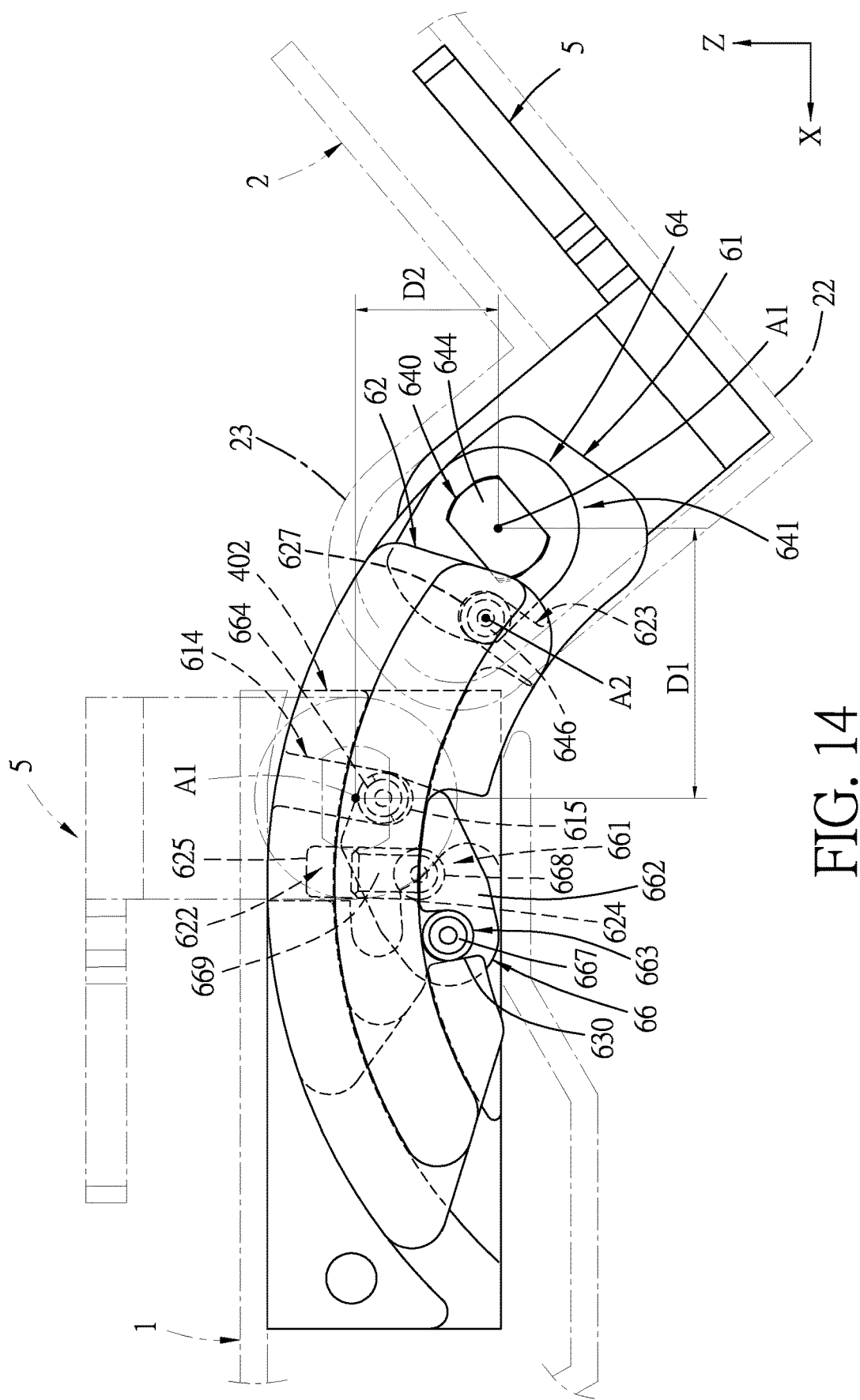
FIG. 14 is a schematic side view illustrating that the first sliding plate and the second sliding plate are in a projecting state, the second frame being removed.

With reference to FIGS. 14 and 15, when the second housing 2 is kept rotating in the first rotational direction (R1) as shown in FIG. 13, the actuating pin 646 is moved toward the upper end portion 627 of the rear slot 623, the first connecting pin 664 is moved toward the lower end portion 615 of the guiding slot 614, and the axle shaft 661 is moved toward the lower end portion 624 of the front slot 622. When the second housing 2 is rotated to the opened position as shown in FIG. 14, the front stop face 630 of the second sliding plate 62 engages with and is stopped by the second pivot section 667 such that the second housing 2 is stopped rotating and retained in the opened position. At this stage, the first and second sliding plates 61, 62 are retained in the projecting state, and the structural relationships of the related component parts are described as follows:

1. The first and second sliding plates 61, 62 project outwardly of the rear end 402 of the base frame 4, and the first sliding plate 61 projects outwardly of the rear end of the second sliding plate 62.
2. The actuating pin 646 of the crank 641 is engaged in the upper end portion 627 of the rear slot 623.
3. The rotating axle 640 is disposed rearwardly of the actuating pin 646. The first rotating axis (A1) of the rotating axle 640 in the projecting state is distant from the first rotating axis (A1) in the retracted state by a rearwardly moved distance (D1) and a downwardly moved distance (D2).
4. The linking body 662 of the linkage unit 66 is tilted. The second connecting pin 668 is engaged in the lower end portion 624 of the front slot 622 and is disposed rearwardly and upwardly of the pivot pin 663. The first connecting pin 664 is engaged in the lower end portion 615 of the guiding slot 614 and is disposed rearwardly and upwardly of the second connecting pin 668.
5. With the rearward and downward movement of the rotating axle 640, the support frame 5 is moved rearwardly and downwardly away from the rear end 402, and the second housing 2 is also moved rearwardly and downwardly to bring the connecting wall 23 away from the rear heat dissipating holes 132 so as to prevent blockage of the same.

With the rearward displacement of the connecting wall 23 relative to the rear wall 13, a heat dissipating space is formed between the connecting and rear walls 23, 13 for facilitating heat dissipation of the receiving space 14 through the rear heat dissipating holes 132. Moreover, with the downward displacement of the connecting wall 23 relative to the rear wall 13, the connecting wall 23 is spaced apart from the rear wall 13 in the up-down direction (Z). Thus, heat from upper portions of the rear heat dissipating holes 132 can flow rearwardly and outwardly of the receiving space 14 so as to enhance heat dissipating efficiency.

Furthermore, during the downward displacement of the connecting wall 23, the juncture between the connecting wall 23 and the outer wall 22 can be placed on a table (not shown) such that the rear wall 13 of the first housing 1 is raised and the first housing 1 is tilted when the second housing 2 is rotated to the opened position. In this state, a keyboard (not shown) disposed on the first housing 1 is also tilted for convenient use. Also, the connecting wall 23 is moved rearwardly and downwardly away from the rear wall 13 such that a display screen (not shown) disposed on the second housing 2 is not concealed by the first housing 1.

With reference to FIGS. 12, 13 and 14, when it is desired to rotate the second housing 2 from the opened position to the closed position, the second housing 2 is turned in a second rotational direction (R2) opposite to the first rotational direction (R1). During the rotation of the second housing 2, the support frame 5 and the rotating axle unit 64 are rotated about the first rotating axis (A1) relative to the first sliding plate 61 to actuate the sliding movements of the first and second sliding plates 61, 62 relative to each other. The first and second sliding plates 61, 62 bring about the pivoting of the linkage unit 66 relative to the base frame 4, and the first and second sliding plates 61, 62 are moved forwardly and upwardly along the first arcuate slot 416 (as shown in FIG. 7) and the second arcuate slot 426 (as shown in FIG. 8), respectively.

During the forward and upward sliding movements of the first and second sliding plates 61, 62, the first and second sliding plates 61, 62 transmit a torque (T2) opposite to the torque (T1) to the first connecting pin 664 and the axle shaft 661 to move the first connecting pin 664 and the axle shaft 661 toward the upper end portion 616 of the guiding slot 614 and the upper end portion 625 of the front slot 622, respectively, so as to bring about the pivoting of the pivot pin 663 of the linkage unit 66 relative to the base frame 4.

With reference to FIGS. 2, 9 and 10, when the second housing 2 is rotated to the closed position as shown in FIG. 2, the rear stop face 618 of the first sliding plate 61 engages with and is stopped by the first pivot section 666 and the rear stop face 629 engages with and is stopped by the second pivot section 667 such that the first and second sliding plates 61, 62 are retained in the retracted state. At this stage, the second housing 2 is stopped and retained in the closed position.

With reference to FIGS. 12 and 14, since the rotating axle 640 is disposed forwardly and upwardly of the actuating pin 646 in the retracted state, and is disposed rearwardly of the actuating pin 646 in the projecting state, during shifting between the retracted and projecting states, the rotating axle 640 has a large angular displacement about the actuating pin 646 so as to increase the sliding displacement of the first sliding plate 61 relative to the second sliding plate 62. Moreover, the second connecting pin 668 is disposed forwardly and upwardly of the pivot pin 663 and the first connecting pin 664 is disposed forwardly and upwardly of the second connecting pin 668 in the retracted state. The second connecting pin 668 is disposed rearwardly and upwardly of the pivot pin 663 and the first connecting pin 664 is disposed rearwardly and upwardly of the second connecting pin 668 in the projecting state. Thus, during the shifting between the retracted and projecting states, the linkage unit 66 has a large angular displacement relative to the base frame 4 so as to increase the sliding displacements of the first and second sliding plates 61, 62 relative to the base frame 4, which enhances the stroke amplifying effect.

It is noted that, in this embodiment, the axle shaft 661 has the second connecting pin 668 and the sliding block 669 engaged in the first sliding plate 61 such that the axle shaft 661 has a larger contact area with the first sliding plate 61. Thus, the first sliding plate 61 can evenly transmit the torque (T1) to a front of the axle shaft 661, and can evenly transmit the torque (T2) to a rear of the axle shaft 661 so as to enhance smoothness and stability of the pivoting of the linkage plate 660. Alternatively, the rotating axle 640 may be integrally formed with the crank 641 to form the rotating axle unit 64 as a one-piece structure. Moreover, with the pivot pin 663 which is disposed as a pivot connection between the linkage unit 66 and the base frame 4, the pivot pin 663 can serve as a stop structure to stop and engage with the rear stop face 618 of the first sliding plate 61 and stop and engage with the rear stop face 629 and the front stop face 630 of the second sliding plate 62. Hence, no extra stop structure and component parts are needed so as to render the hinge 3 simplified. Alternatively, other structures or features may be disposed on the linkage unit 66 and the first and second sliding plates 61, 62 to stop the sliding movements of the first and second sliding plates 61, 62.

Figure 16:
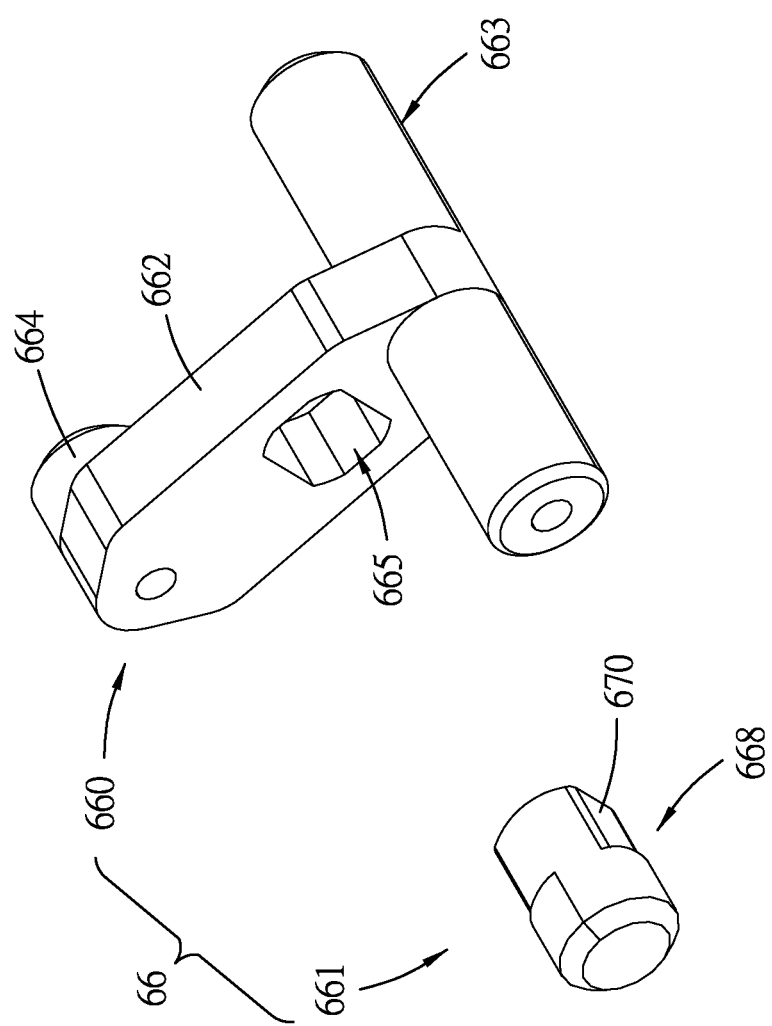
FIG. 16 is an exploded perspective view of a linkage unit in another embodiment.
Figure 17:
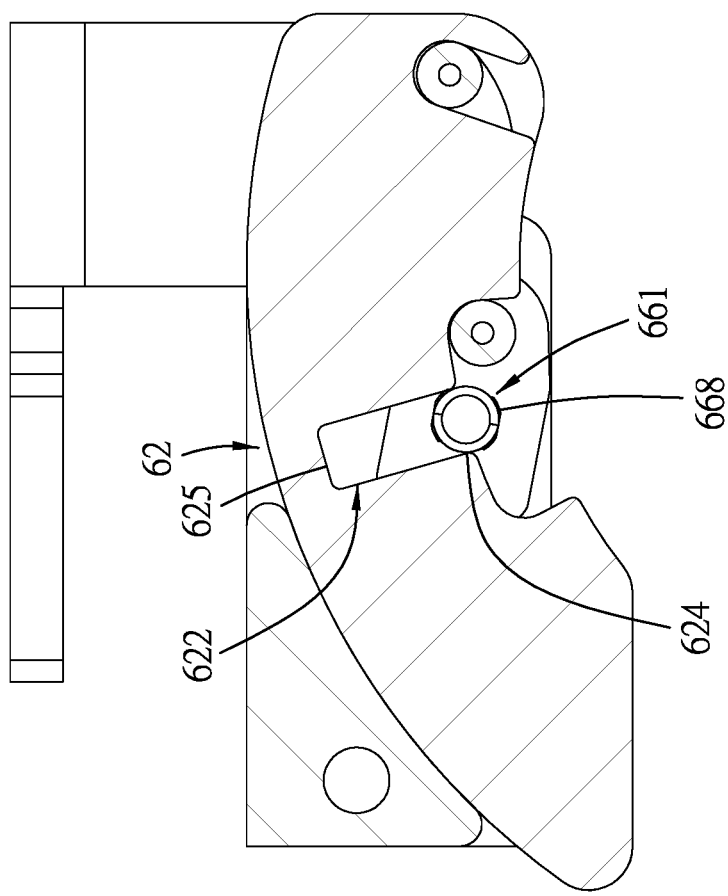
FIG. 17 is a sectional view of the embodiment.

With reference to FIGS. 16 and 17, in another embodiment, the linkage unit 66 includes a linkage plate 660 and an axle shaft 661. The linkage plate 660 has a non-circular mounting hole 665. The axle shaft 661 only has a second connecting pin 668. The second connecting pin 668 has a connecting section 670 which is non-circular in cross-section and in spline engagement with the mounting hole 665 such that the axle shaft 661 is non-rotatably connected with the linkage plate 660.

It is noted that, in another modified form, the second connecting pin 668 of the axle shaft 661 may be integrally formed with the linking body 662.

Figure 18:
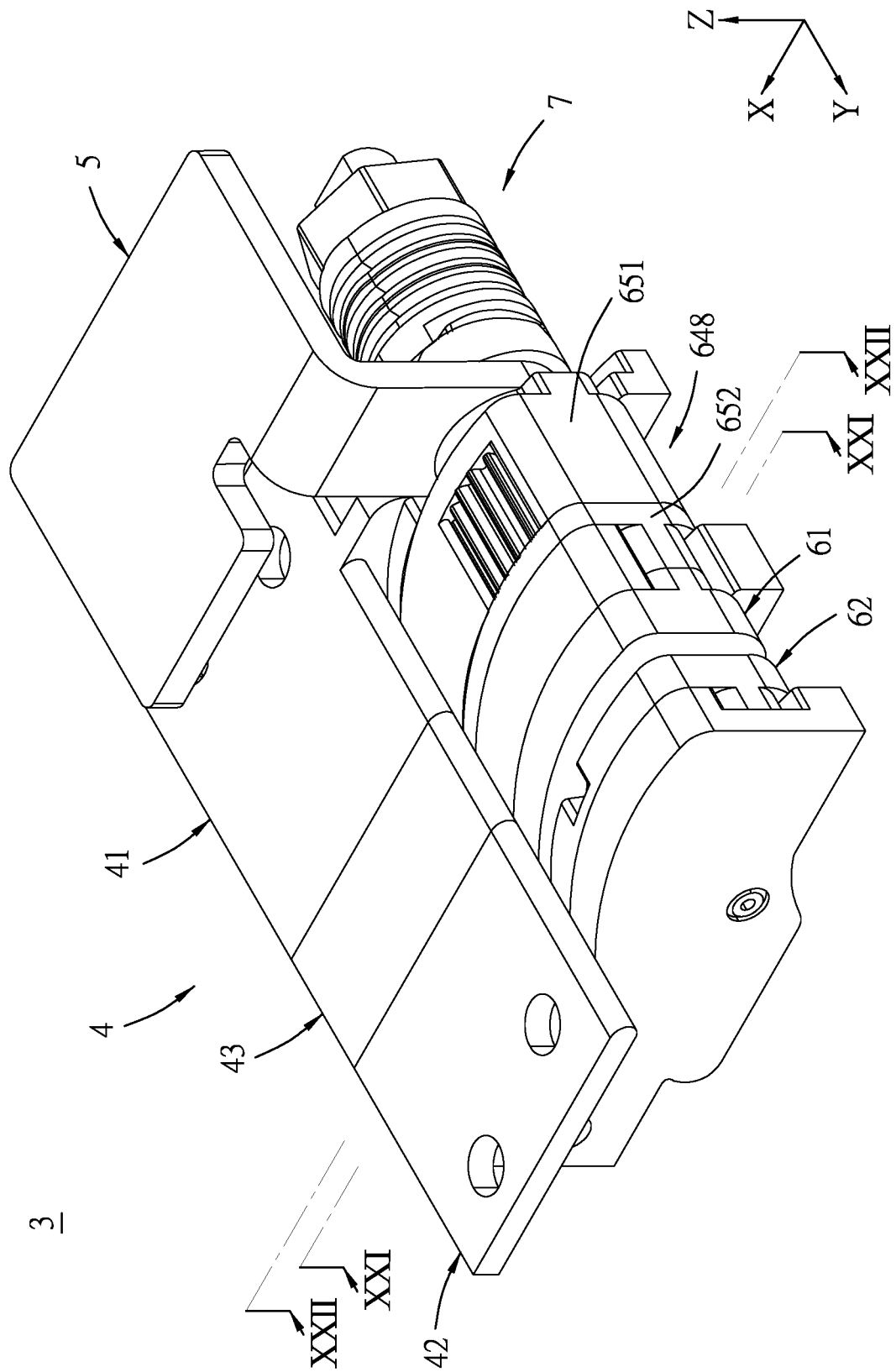
FIG. 18 is a perspective view illustrating another embodiment of the hinge according to the disclosure.
Figure 19:
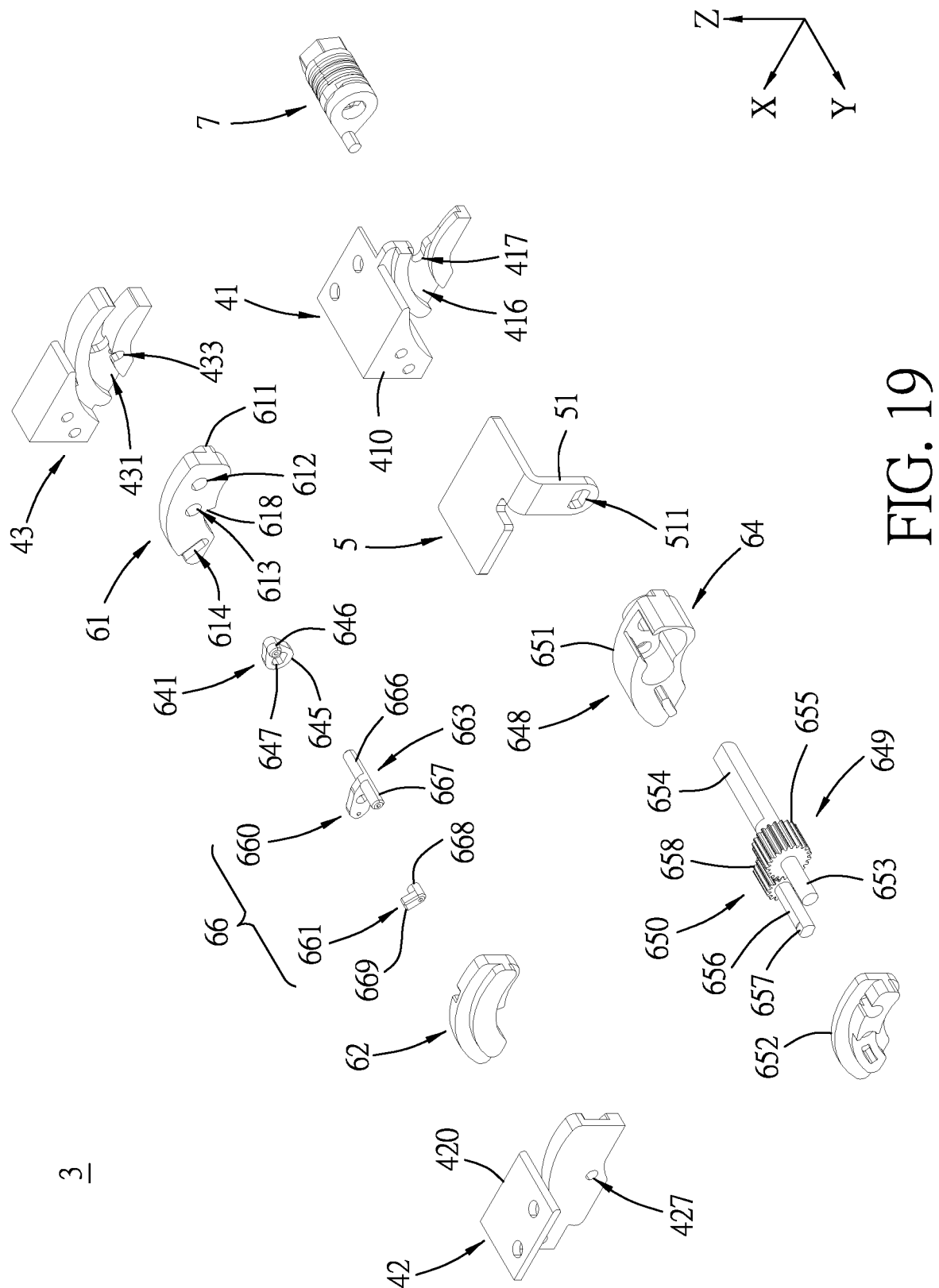
FIG. 19 is an exploded perspective view illustrating the hinge of the embodiment.
Figure 20:
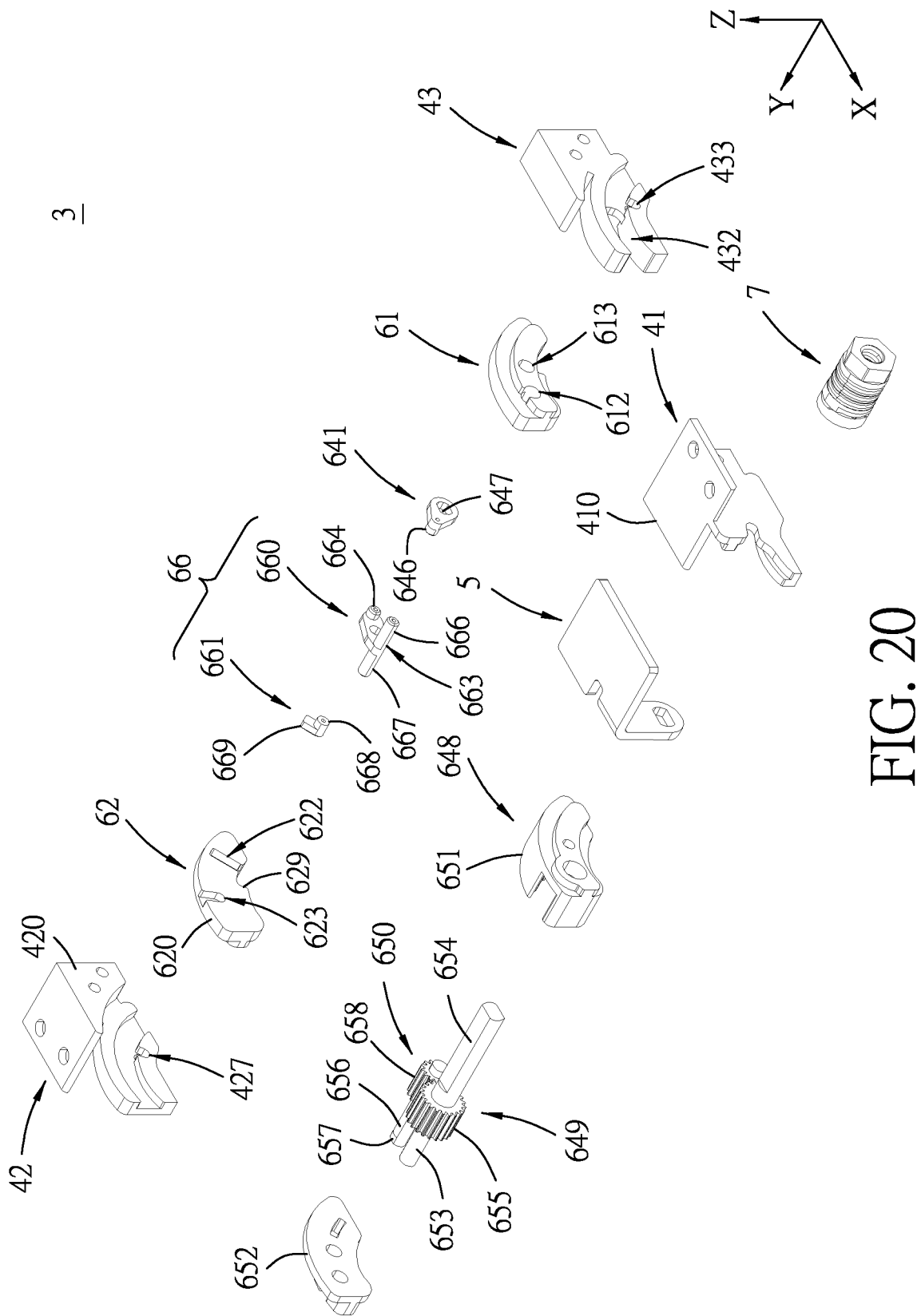
FIG. 20 is an exploded perspective view of the hinge taken from another angle.

With reference to FIGS. 18, 19 and 20, in another embodiment, the base frame 4 further has a third frame body 43 interposed between the first and second frame bodies 41, 42 and sandwiched between the first and second protrusions 410, 420. The third frame body 43 has two arcuate auxiliary slots 431, 432 opposite to each other in the left-right direction (Y). The arcuate auxiliary slots 431, 432 are configured in the same manner as the first arcuate slot 416 such that the first sliding protrusion 611 is fittingly and slidably engaged in the arcuate auxiliary slot 431. The rear portions of the arcuate auxiliary slots 431, 432 are in communication with each other. The third frame body 43 further has a third pivot hole 433 aligned with the first pivot hole 417 such that the first pivot section 666 of the pivot pin 663 is also rotatably connected with the third pivot hole 433.

Figure 21:
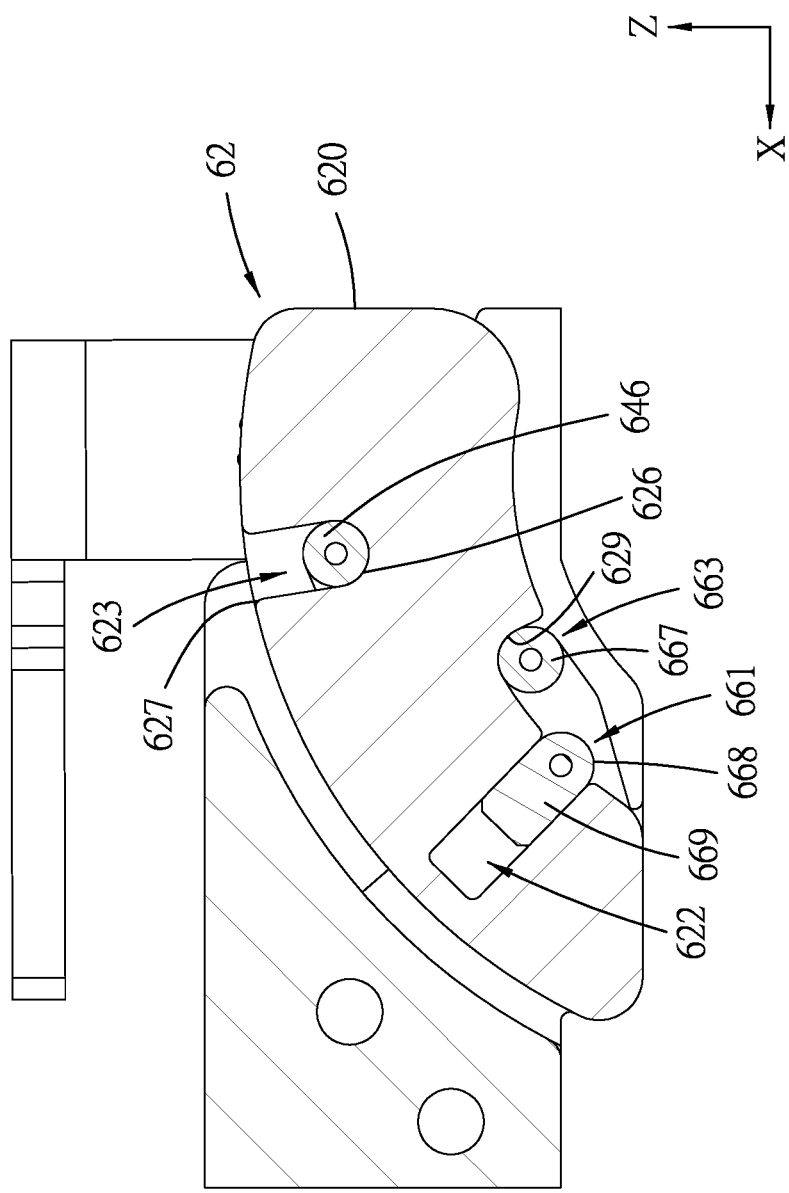
FIG. 21 is a sectional view taken along line XXI-XXI of FIG. 18.

With reference to FIGS. 20 and 21, the rear slot 623 of the second sliding plate 62 extends from the upper end of the second plate body 620 and is inclined downwardly and rearwardly, and the front stop face 630 of the second sliding plate 62 is dispensed with.

Figure 22:
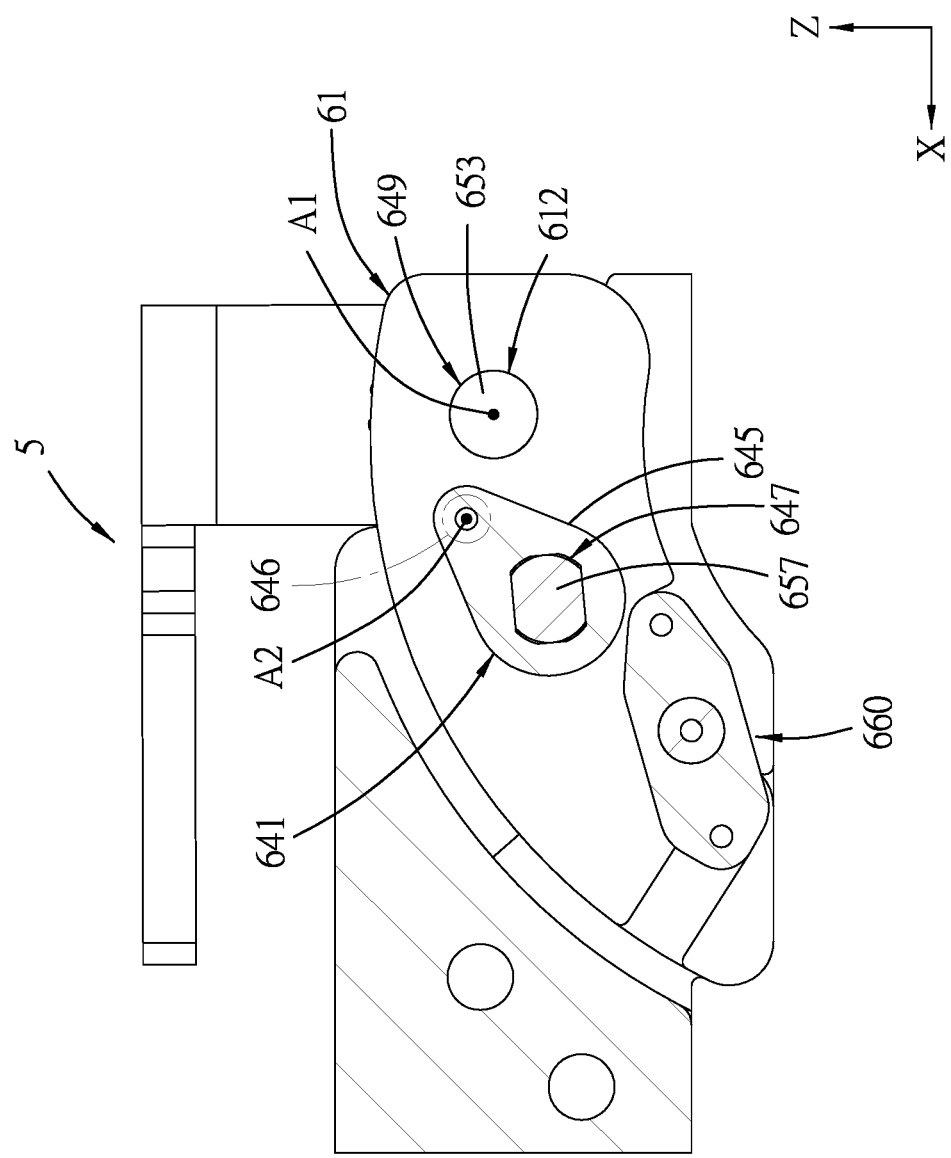
FIG. 22 is a sectional view taken along line XXII-XXII of FIG. 18.

With reference to FIGS. 19, 20 and 22, the rotating axle unit 64 includes an axle housing 648, a first rotating axle 649 and a second rotating axle 650. The axle housing 648 has an arcuate housing 651 which is slidably connected with the first arcuate slot 416 of the first frame body 41, and an arcuate cover 652 which is disposed at a left side of the arcuate housing 651 and slidably connected with the arcuate auxiliary slot 432 of the third frame body 43.

The first rotating axle 649 extends along the first rotating axis (A1) and has a first pivot section 653, a first spline section 654 at a right end of the first pivot section 653, and a first pinion 655 formed at a middle of the first pivot section 653. The first pivot section 653 is rotatably engaged with the axle housing 648 and the pivot hole 612 of the first sliding plate 61. The first spline section 654 has a non-circular cross-section, and is in spline engagement with the non-circular hole 511 of the support frame 5 and projects rightwardly of the upright plate 51. The frictional torque module 7 is sleeved around the first spline section 654 that projects outwardly of the upright plate 51.

The second rotating axle 650 is disposed forwardly of and parallel to the first rotating axle 649, and has a second pivot section 656, a second spline section 657 at a left end of the second pivot section 656, and a second pinion 658 formed on the second pivot section 656. The second pivot section 656 is rotatably engaged with the axle housing 648 and the mounting hole 613 of the first sliding plate 61. The second spline section 657 has a non-circular cross-section, and is in spline engagement with the non-circular hole 647 of the crank 641. The second pinion 658 meshes with the first pinion 655.

Figure 23:
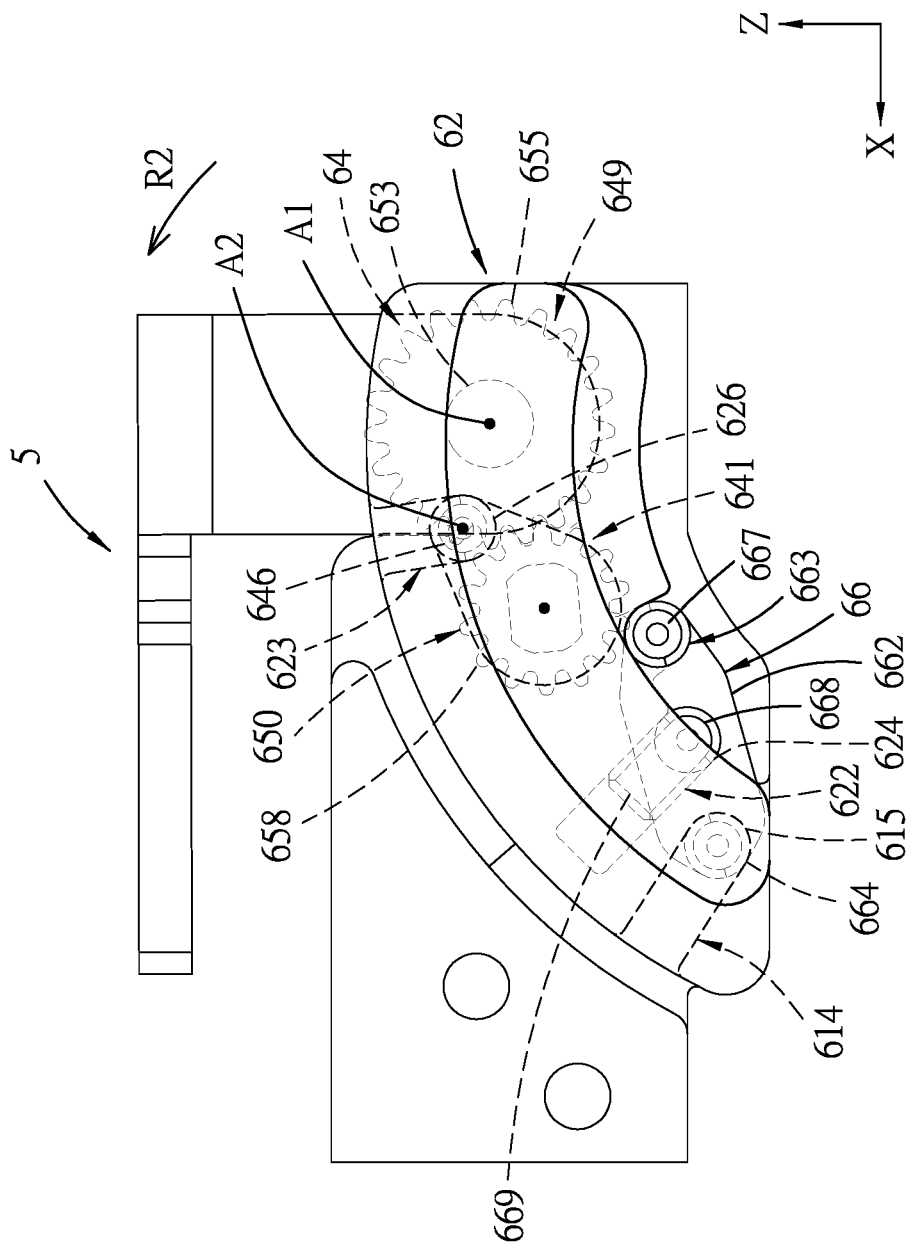
FIG. 23 is a schematic side view illustrating that a first sliding plate and a second sliding plate of the hinge are in a retracted state, a second frame being removed for the sake of clarity.

With reference to FIG. 23, in the retracted state, the actuating pin 646 is engaged in the lower end portion 626 of the rear slot 623, and the second rotating axle 650 is disposed forwardly and downwardly of the actuating pin 646.

Figure 24:
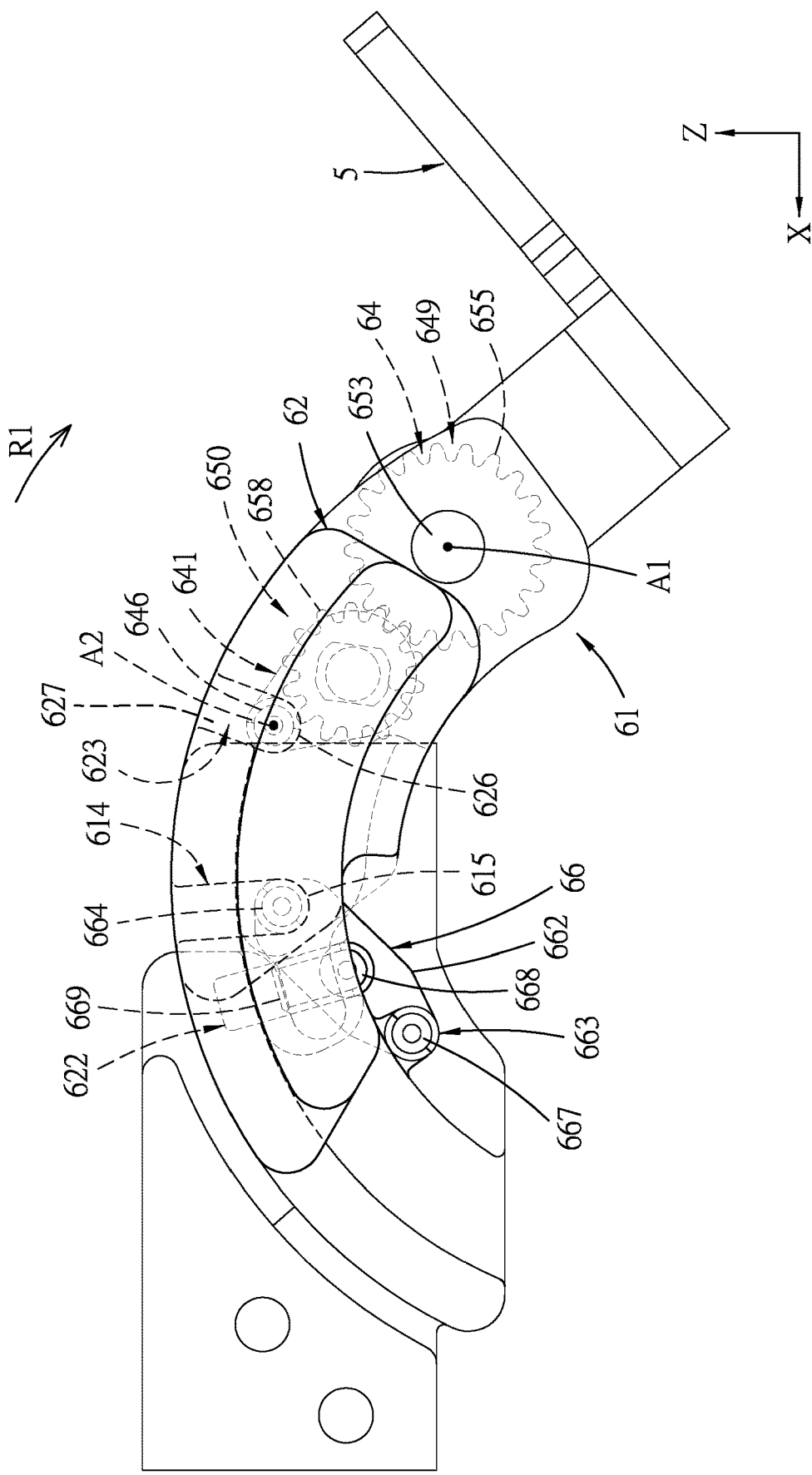
FIG. 24 is a schematic side view illustrating that the first sliding plate and the second sliding plate are in a projecting state, the second frame being removed.

With reference to FIGS. 23 and 24, when the second housing 2 (as shown in FIG. 2) is rotated in the first rotating direction (R1), the support frame 5 and the first rotating axle 649 are rotated about the first rotating axis (A1). Through an opposite rotation of the second pinion 658 to the first pinion 655, the actuating pin 646 is rotated about the second rotating axis (A2) relative to the second sliding plate 62 and is moved toward the upper end portion 627 of the rear slot 623, and the second rotating axle 650 is rotated about the actuating pin 646. Thus, the rotating axle unit 64 urges sliding movements of the first and second sliding plates 61, 62 relative to each other.

When the first and second sliding plates 61, 62 are shifted to the projecting state as shown in FIG. 24, the second housing 2 is in the opened position, the actuating pin 646 is engaged in the lower end portion 626 of the rear slot 623, and the second rotating axle 650 is disposed rearwardly and downwardly of the actuating pin 646. The second housing 2 is returned to the closed position when rotated in the second rotational direction (R2).

With the first rotating axle 649 connected with the support frame 5, and the second rotating axle 650 connected with the crank 641, and the meshing engagement of the first and second pinions 655, 658, the crank 641 is disposed at a front of the first rotating axle 649 and does not take up a space below the first rotating axle 649, which decreases the receiving space 14 of the first housing 1 (see FIG. 3) required for receiving the hinge 3.

Figure 25:
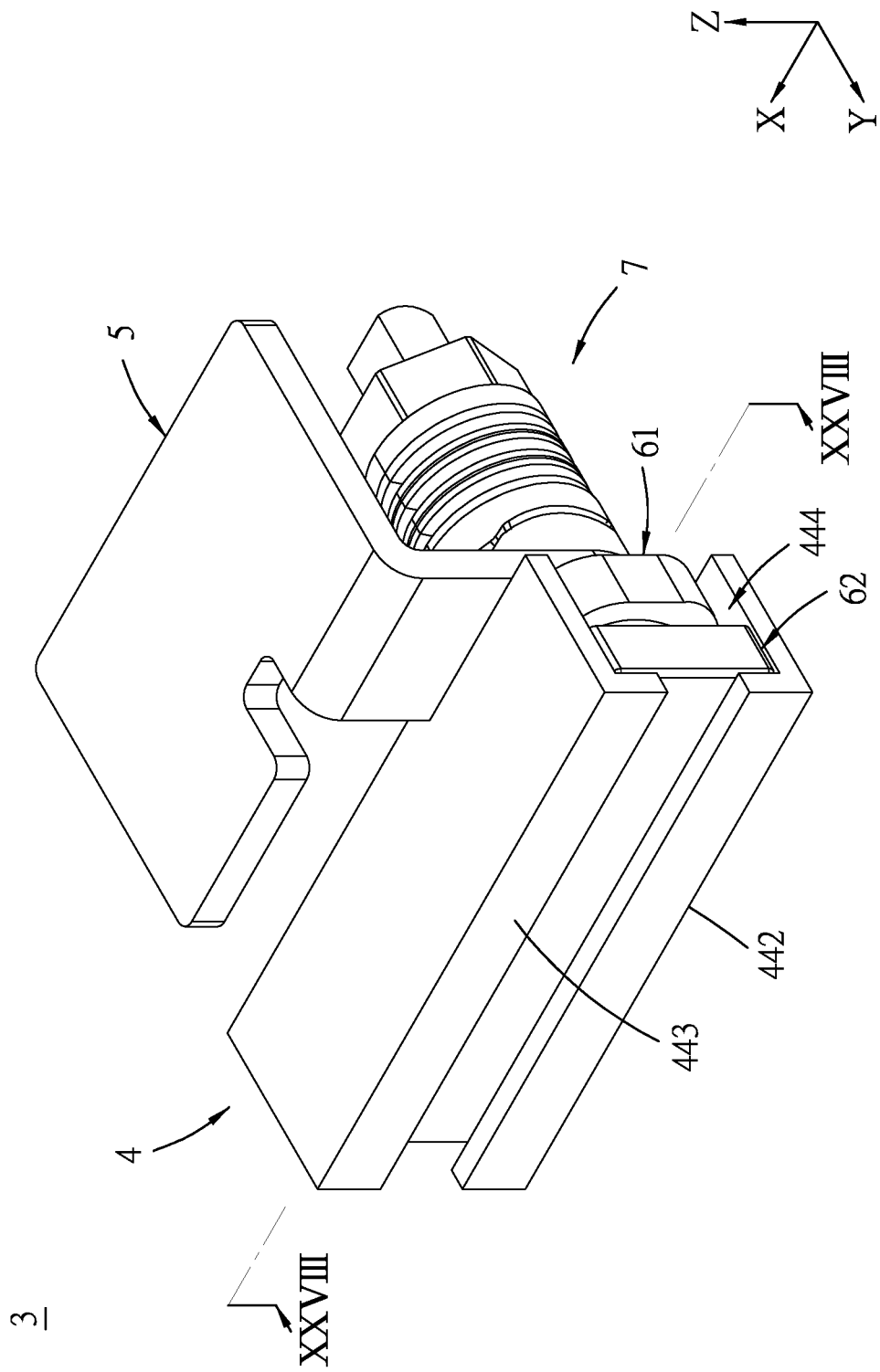
FIG. 25 is a perspective view illustrating still another embodiment of the hinge according to the disclosure.
Figure 26:
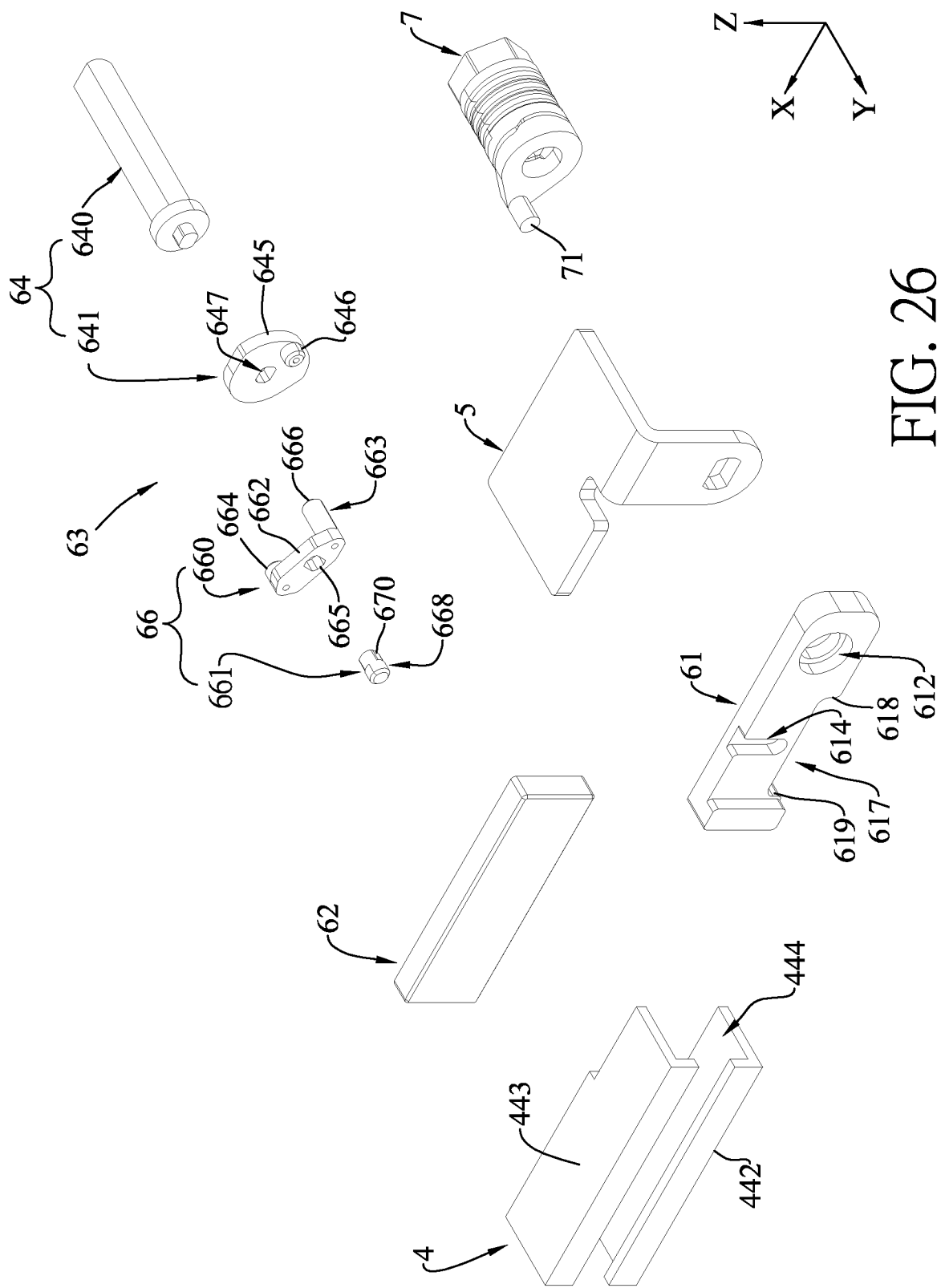
FIG. 26 is an exploded perspective view illustrating the hinge of the embodiment.
Figure 27:
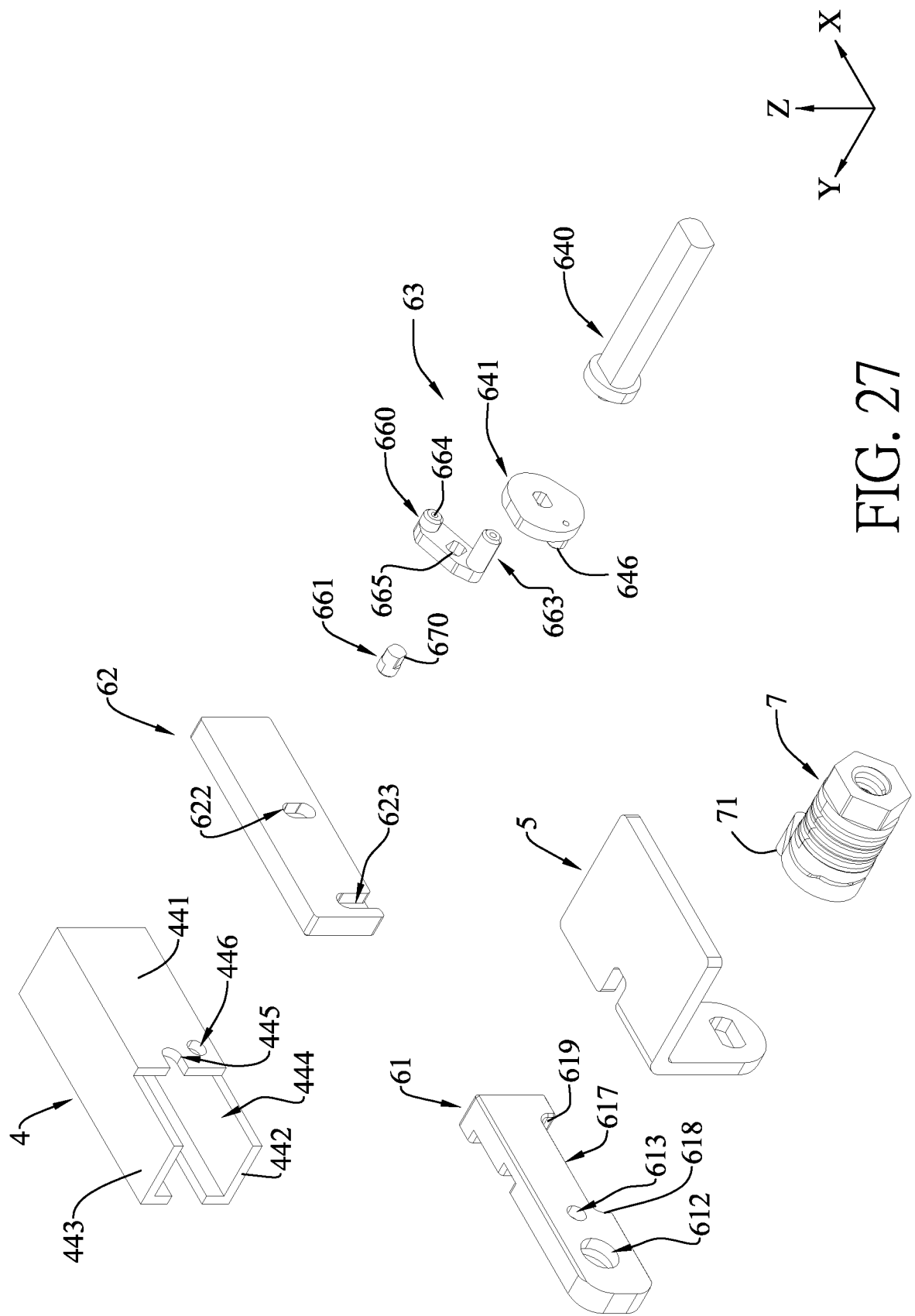
FIG. 27 is an exploded perspective view of the hinge taken from another angle.

With reference to FIGS. 25, 26 and 27, in another embodiment, the base frame 4 includes a right side wall 441, a bottom wall 442 extending leftwardly from a bottom of the right side wall 441, and a top wall 443 extending leftwardly from a top of the right side wall 441. The right side wall 441 is shorter than both the bottom wall 442 and the top wall 443 and cooperates with the bottom and top walls 442, 443 to define an elongated slot 444 which is elongated in the front-rear direction (X). A rear notch 445 is recessed from a rear face of the right side wall 441 and in communication with the elongated slot 444 for engaging with the positioning stud 71 of the frictional torque module 7. The right side wall 441 has a pivot hole 446 below the rear notch 445. The top wall 443 is fastened to the top wall 12 of the first housing 1 (as shown in FIG. 2).

The first sliding plate 61 is in the form of a square plate and is slidably engaged in the elongated slot 444. The guiding slot 614 of the first sliding plate 61 is a straight elongated slot extending downwardly from an upper end of the first sliding plate 61. The first sliding plate 61 has a rear stop face 618 formed at a rear end of the first notch 617, and a front stop face 619 formed at a front end of the first notch 617.

The second sliding plate 62 is also in the form of a square plate and is slidably engaged in the elongated slot 444. The front slot 622 of the second sliding plate 62 is a straight elongated slot formed in a middle portion thereof and extending in the up-down direction (Z). The rear slot 623 of the second sliding plate 62 is a straight elongated slot extending upwardly from a lower end of the second sliding plate 62.

In this embodiment, the linkage unit 66 is similar to that shown in FIG. 16, but the pivot pin 663 merely has the first pivot section 666.

Figure 28:
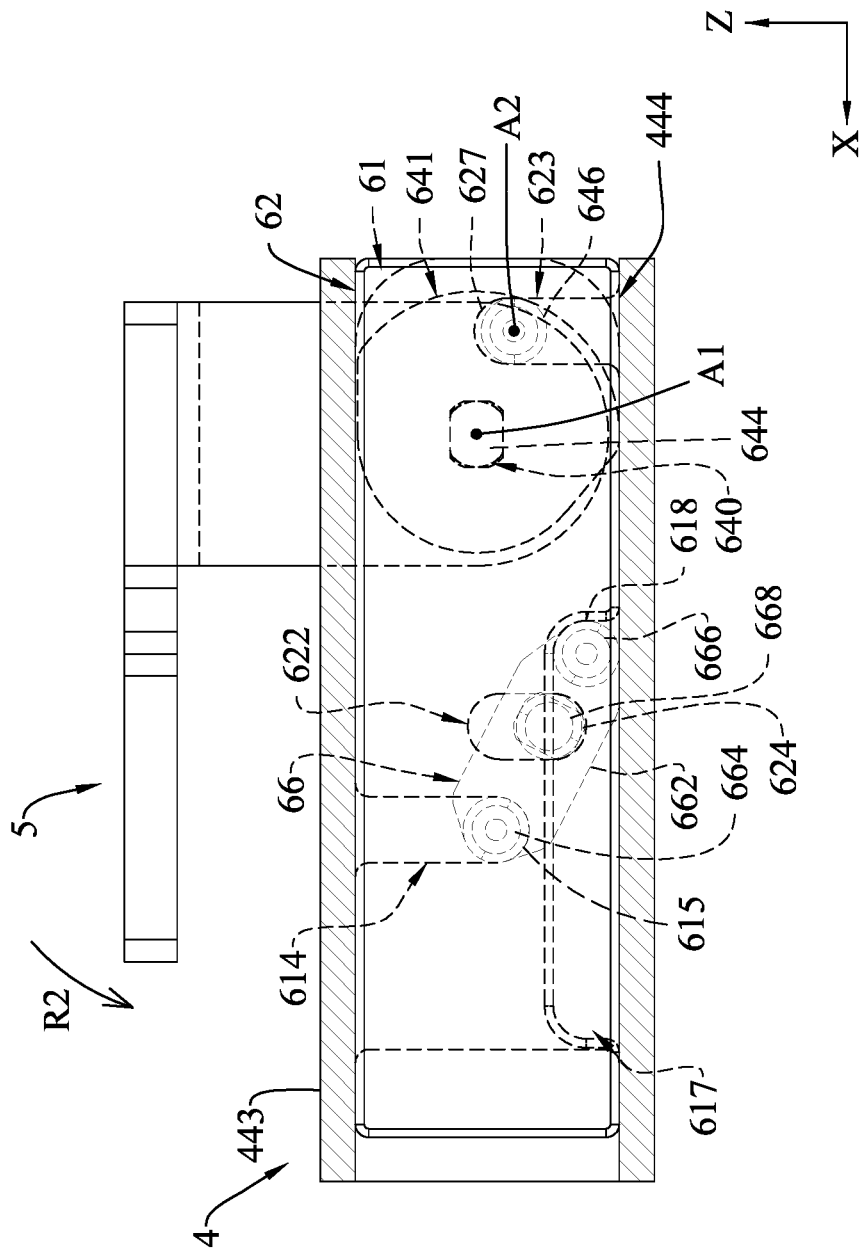
FIG. 28 is a sectional view taken along line XXVIII-XXVIII of FIG. 25, illustrating that a first sliding plate and a second sliding plate of the hinge are in a retracted state.

With reference to FIG. 28, in the retracted state, the actuating pin 646 is engaged in the upper end portion 627 of the rear slot 623, and the rotating axle 640 is disposed forwardly and upwardly of the actuating pin 646.

Figure 29:
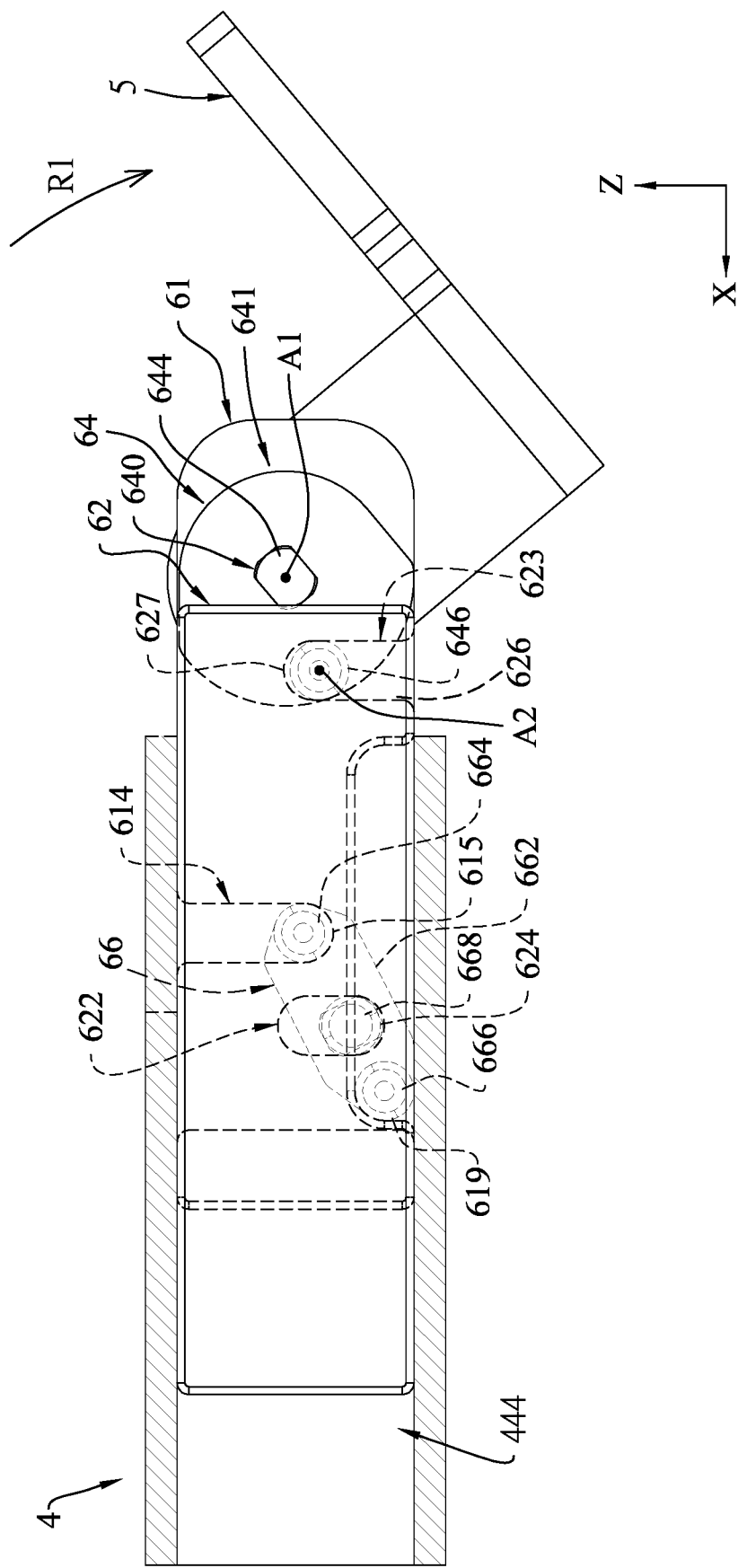
FIG. 29 is a sectional view similar to FIG. 28, illustrating that the first sliding plate and the second sliding plate are in a projecting state.

With reference to FIGS. 28 and 29, when the second housing 2 (as shown in FIG. 15) is rotated in the first rotational direction (R1), the support frame 5 and the rotating axle unit 64 are rotated about the first rotating axis (A1). During the rotation of the rotating axle unit 64 about the first rotating axis (A1), the actuating pin 646 is rotated about the second rotating axis (A2) relative to the second sliding plate 62 and is moved toward the lower end portion 626 of the rear slot 623 such that the rotating axle 640 is rotated about the actuating pin 646. Thus, the rotating axle unit 64 urges sliding movements of the first and second sliding plates 61, 62 relative to each other. The first and second sliding plates 61, 62 actuate the rotation of the linkage unit 66 relative to the base frame 4. The angular displacement of the linkage unit 66 brings the first and second sliding plates 61, 62 into a rearward sliding movement along the elongated slot 444.

When the first and second sliding plates 61, 62 are shifted to the projecting state as shown in FIG. 29, the second housing 2 is in the opened position, the actuating pin 646 is engaged in the upper end portion 627 of the rear slot 623, and the rotating axle 640 is disposed rearwardly and upwardly of the actuating pin 646. The second housing 2 is returned to the closed position when rotated in the second rotational direction (R2).

In this embodiment, with the hinge 3 which brings the support frame 5 into a straight rearward movement in the front-rear direction (X), the second housing 2 which is securely connected with the support frame 5 is moved straightly and rearwardly to bring the connecting wall 23 (as shown in FIG. 15) away from the rear heat dissipating holes 132 so as to prevent blockage of the same. The hinge 3 of this embodiment has a relatively simple construction to reduce the structural complexity and manufacturing costs.

As illustrated, with the first and second sliding plates 61, 62 which, in the projecting state, bring at least the support frame 5 into a rearward movement away from the rear end 402 of the base frame 4, the connecting wall 23 of the second housing 2 is moved away from the rear heat dissipating holes 132 so as to prevent blockage of the same to enhance the heat dissipating efficiency of the first housing 1. Moreover, in the certain embodiments, the first and second sliding plates 61, 62 are moved downwardly with the rearward movement thereof through the support frame 5 such that the connecting wall 23 is spaced apart from the rear wall 13 in the up-down direction (Z), which further enhances the heat dissipating efficiency. Furthermore, during the downward movement of the connecting wall 23, the rear wall 13 of the first housing 1 is raised and the first housing 1 is tilted for convenient use of a keyboard which is disposed on the first housing, and for preventing concealing of the second housing 2 on which a display screen is disposed.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A hinge comprising:
    a base frame including front and rear ends opposite to each other in a front-rear direction;
    a support frame; and
    a transmitting mechanism including
        a first sliding plate which is connected with and slidable relative to said base frame in the front-rear direction,
        a second sliding plate which is connected with and slidable relative to said base frame in the front-rear direction and which is aligned with said first sliding plate in a left-right direction, and
        a transmitting assembly including a rotating axle unit which is non-rotatably connected with said support frame and which is rotatably connected with both said first sliding plate and said second sliding plate respectively about a first rotating axis and a second rotating axis that are parallel to each other in the left-right direction and offset from each other in the front-rear direction, and a linkage unit which is pivotably connected to said base frame about a pivot axis and which is rotatably connected with both said first sliding plate and said second sliding plate, said rotating axle unit being disposed to be moved with said support frame to cause sliding movements of said first and second sliding plates relative to each other, and a pivoting of said linkage unit about the pivot axis relative to said base frame such that said first sliding plate and said second sliding plate are shiftable between a retracted state, where said first and second sliding plates are superimposed upon each other and disposed within said base frame to have said support frame be close to said rear end of said base frame, and a projecting state, where said first and second sliding plates project from said rear end of said base frame to have said support frame be remote from said rear end.

2. The hinge as claimed in claim 1, wherein said support frame and said rotating axle unit are rotatable about the first rotating axis relative to said first sliding plate, said rotating axle unit being rotatable about the second rotating axis relative to said second sliding plate, said linkage unit including a pivot pin which extends along the pivot axis to be rotatably connected with said base frame, a first connecting pin which extends along a first connecting axis and which is rotatably and movably connected with said first sliding plate, and a second connecting pin which extends along a second connecting axis and which is movably connected with said second sliding plate, a distance between the pivot axis and the first connecting axis being different from a distance between the pivot axis and the second connecting axis.

3. The hinge as claimed in claim 2, wherein said second connecting pin is interposed between said pivot pin and said first connecting pin in the front-rear direction, and each of the first and second connecting axes is parallel to the pivot axis such that the distance between the pivot axis and the first connecting axis is larger than the distance between the pivot axis and the second connecting axis, said first sliding plate having a guiding slot which extends to have upper and lower end portions, said first connecting pin being rotatably and movably engaged in said guiding slot, said second sliding plate having a front slot which extends to have upper and lower end portions, said second connecting pin being movably engaged in said front slot, wherein, in the retracted state, said second connecting pin is engaged in said lower end portion of said front slot and is disposed forwardly and upwardly of said pivot pin while said first connecting pin is engaged in said lower end portion of said guiding slot and is disposed forwardly and upwardly of said second connecting pin, and, in the projecting state, said second connecting pin is engaged in said lower end portion of said front slot and is disposed rearwardly and upwardly of said pivot pin while said first connecting pin is engaged in said lower end portion of said guiding slot and is disposed rearwardly and upwardly of said second connecting pin.

4. The hinge as claimed in claim 3, wherein said linkage unit includes a linkage plate and an axle shaft, said linkage plate having said pivot pin and said first connecting pin disposed thereon, and a mounting hole formed between said pivot pin and said first connecting pin, said axle shaft having said second connecting pin and a sliding block extending radially and outwardly from an outer periphery of said second connecting pin, said second connecting pin being rotatably engaged in said mounting hole and being movably received in said front slot, said sliding block being movably received in said front slot.

5. The hinge as claimed in claim 2, wherein at least one of said first and second sliding plates has a rear stop face, at least one of said first and second sliding plates having a front stop face, wherein, during shifting of said first and second sliding plates, said pivot pin is engageable with said rear stop face to stop said first and second sliding plates in the retracted state, and is engageable with said front stop face to stop said first and second sliding plates in the projecting state.

6. The hinge as claimed in claim 2, wherein said base frame has a first arcuate slot in which said first sliding plate is slidably engaged, and a second arcuate slot in which said second sliding plate is slidably engaged, each of said first and second arcuate slots being arcuated about a center which is below said base frame in an up-down direction.

7. The hinge as claimed in claim 6, wherein said second sliding plate has a rear slot which extends to have upper and lower end portions, said rotating axle unit including a rotating axle which is in spline engagement with said support frame and which is rotatably engaged with said first sliding plate, and a crank which is non-rotatably connected with said rotating axle and which is interposed between said first and second sliding plates, said rotating axle extending along the first rotating axis, said crank having an actuating pin which extends along the second rotating axis and which is rotatably and movably engaged in said rear slot, wherein, in the retracted state, said actuating pin is engaged in said upper end portion of said rear slot, said rotating axle is disposed forwardly and upwardly of said actuating pin, and the first rotating axis is behind the center of said first arcuate slot in the front-rear direction, and, in the projecting state, said actuating pin is engaged in said upper end portion of said rear slot and said rotating axle is disposed rearwardly of said actuating pin.

8. The hinge as claimed in claim 6, wherein said second sliding plate has a rear slot which extends to have upper and lower end portions, said rotating axle unit including a first rotating axle which is in spline engagement with said support frame and which is rotatably engaged with said first sliding plate, a second rotating axle which is rotatably engaged with said first sliding plate, and a crank which is non-rotatably connected with said second rotating axle and which is interposed between said first and second sliding plates, said first rotating axle extending along the first rotating axis and having a first pinion, said second rotating axle being disposed forwardly of said first rotating axle and parallel to said first rotating axle and having a second pinion which meshes with said first pinion, said crank having an actuating pin which extends along the second rotating axis and which is rotatably and movably engaged in said rear slot, wherein, in the retracted state, said actuating pin is engaged in said lower end portion of said rear slot, said second rotating axle is disposed forwardly and downwardly of said actuating pin, and the first rotating axis is behind the center of said first arcuate slot in the front-rear direction, and, in the projecting state, said actuating pin is engaged in said lower end portion of said rear slot and said second rotating axle is disposed rearwardly and downwardly of said actuating pin.

9. The hinge as claimed in claim 2, wherein said base frame has an elongated slot which extends in the front-rear direction, said first and second sliding plates being slidably engaged in said elongated slot.

10. The hinge as claimed in claim 9, wherein said second sliding plate has a rear slot which extends to have upper and lower end portions, said rotating axle unit including a rotating axle which is in spline engagement with said support frame and which is rotatably engaged with said first sliding plate, and a crank which is non-rotatably connected with said rotating axle and which is interposed between said first and second sliding plates, said rotating axle extending along the first rotating axis, said crank having an actuating pin which extends along the second rotating axis and which is rotatably and movably engaged in said rear slot, wherein, in the retracted state, said actuating pin is engaged in said upper end portion of said rear slot, and said rotating axle is disposed forwardly and upwardly of said actuating pin, and, in the projecting state, said actuating pin is engaged in said upper end portion of said rear slot, and said rotating axle is disposed rearwardly and upwardly of said actuating pin.

11. An electronic device comprising:
a first housing having a plurality of rear heat dissipating holes;
a second housing; and
a hinge including
a base frame connected to said first housing, and including front and rear ends opposite to each other in a front-rear direction;
a support frame connected to said second housing; and
a transmitting mechanism including
a first sliding plate which is connected with and slidable relative to said base frame in the front-rear direction,
a second sliding plate which is connected with and slidable relative to said base frame in the front-rear direction and which is aligned with said first sliding plate in a left-right direction, and
a transmitting assembly including a rotating axle unit which is non-rotatably connected with said support frame and which is rotatably connected with both said first sliding plate and said second sliding plate respectively about a first rotating axis and a second rotating axis that are parallel to each other in the left-right direction and offset from each other in the front-rear direction, and a linkage unit which is pivotably connected to said base frame about a pivot axis and which is rotatably connected with both said first sliding plate and said second sliding plate, said rotating axle unit being disposed to be moved with said support frame to cause sliding movements of said first and second sliding plates relative to each other, and a pivoting of said linkage unit about the pivot axis relative to said base frame such that said first sliding plate and said second sliding plate are shiftable between a retracted state, where said first and second sliding plates are superimposed upon each other and disposed within said base frame to have said support frame be close to said rear end of said base frame, and a projecting state, where said first and second sliding plates project from said rear end of said base frame to have said support frame be remote from said rear end, and such that, in the retracted state, said second housing is disposed in a closed position to cover said first housing, and, in the projecting state, said second housing is disposed in an opened position to be remote from said rear heat dissipating holes.

12. The electronic device as claimed in claim 11, wherein said support frame and said rotating axle unit are rotatable about the first rotating axis relative to said first sliding plate, said rotating axle unit being rotatable about the second rotating axis relative to said second sliding plate, said linkage unit including a pivot pin which extends along the pivot axis to be rotatably connected with said base frame, a first connecting pin which extends along a first connecting axis and which is rotatably and movably connected with said first sliding plate, and a second connecting pin which extends along a second connecting axis and which is movably connected with said second sliding plate, a distance between the pivot axis and the first connecting axis being different from a distance between the pivot axis and the second connecting axis.

13. The electronic device as claimed in claim 12, wherein said second connecting pin is interposed between said pivot pin and said first connecting pin in the front-rear direction, and each of the first and second connecting axes is parallel to the pivot axis such that the distance between the pivot axis and the first connecting axis is larger than the distance between the pivot axis and the second connecting axis, said first sliding plate having a guiding slot which extends to have upper and lower end portions, said first connecting pin being rotatably and movably engaged in said guiding slot, said second sliding plate having a front slot which extends to have upper and lower end portions, said second connecting pin being movably engaged in said front slot, wherein, in the retracted state, said second connecting pin is engaged in said lower end portion of said front slot and is disposed forwardly and upwardly of said pivot pin while said first connecting pin is engaged in said lower end portion of said guiding slot and is disposed forwardly and upwardly of said second connecting pin, and, in the projecting state, said second connecting pin is engaged in said lower end portion of said front slot and is disposed rearwardly and upwardly of said pivot pin while said first connecting pin is engaged in said lower end portion of said guiding slot and is disposed rearwardly and upwardly of said second connecting pin.

14. The electronic device as claimed in claim 13, wherein said linkage unit includes a linkage plate and an axle shaft, said linkage plate having said pivot pin and said first connecting pin disposed thereon, and a mounting hole formed between said pivot pin and said first connecting pin, said axle shaft having said second connecting pin and a sliding block extending radially and outwardly from an outer periphery of said second connecting pin, said second connecting pin being rotatably engaged in said mounting hole and being movably received in said front slot, said sliding block being movably received in said front slot.

15. The electronic device as claimed in claim 12, wherein at least one of said first and second sliding plates has a rear stop face, at least one of said first and second sliding plates having a front stop face, wherein, during shifting of said first and second sliding plates, said pivot pin is engageable with said rear stop face to stop said first and second sliding plates in the retracted state, and is engageable with said front stop face to stop said first and second sliding plates in the projecting state.

16. The electronic device as claimed in claim 12, wherein said base frame has a first arcuate slot in which said first sliding plate is slidably engaged, and a second arcuate slot in which said second sliding plate is slidably engaged, each of said first and second arcuate slots being arcuated about a center which is below said base frame in an up-down direction.

17. The electronic device as claimed in claim 16, wherein said second sliding plate has a rear slot which extends to have upper and lower end portions, said rotating axle unit including a rotating axle which is in spline engagement with said support frame and which is rotatably engaged with said first sliding plate, and a crank which is non-rotatably connected with said rotating axle and which is interposed between said first and second sliding plates, said rotating axle extending along the first rotating axis, said crank having an actuating pin which extends along the second rotating axis and which is rotatably and movably engaged in said rear slot, wherein, in the retracted state, said actuating pin is engaged in said upper end portion of said rear slot, said rotating axle is disposed forwardly and upwardly of said actuating pin, and the first rotating axis is behind the center of said first arcuate slot in the front-rear direction, and, in the projecting state, said actuating pin is engaged in said upper end portion of said rear slot and said rotating axle is disposed rearwardly of said actuating pin.

18. The electronic device as claimed in claim 16, wherein said second sliding plate has a rear slot which extends to have upper and lower end portions, said rotating axle unit including a first rotating axle which is in spline engagement with said support frame and which is rotatably engaged with said first sliding plate, a second rotating axle which is rotatably engaged with said first sliding plate, and a crank which is non-rotatably connected with said second rotating axle and which is interposed between said first and second sliding plates, said first rotating axle extending along the first rotating axis and having a first pinion, said second rotating axle being disposed forwardly of said first rotating axle and parallel to said first rotating axle and having a second pinion which meshes with said first pinion, said crank having an actuating pin which extends along the second rotating axis and which is rotatably and movably engaged in said rear slot, wherein, in the retracted state, said actuating pin is engaged in said lower end portion of said rear slot, said second rotating axle is disposed forwardly and downwardly of said actuating pin, and the first rotating axis is behind the center of said first arcuate slot in the front-rear direction, and, in the projecting state, said actuating pin is engaged in said lower end portion of said rear slot and said second rotating axle is disposed rearwardly and downwardly of said actuating pin.

19. The electronic device as claimed in claim 12, wherein said base frame has an elongated slot which extends in the front-rear direction, said first and second sliding plates being slidably engaged in said elongated slot.

20. The electronic device as claimed in claim 19, wherein said second sliding plate has a rear slot which extends to have upper and lower end portions, said rotating axle unit including a rotating axle which is in spline engagement with said support frame and which is rotatably engaged with said first sliding plate, and a crank which is non-rotatably connected with said rotating axle and which is interposed between said first and second sliding plates, said rotating axle extending along the first rotating axis, said crank having an actuating pin which extends along the second rotating axis and which is rotatably and movably engaged in said rear slot, wherein, in the retracted state, said actuating pin is engaged in said upper end portion of said rear slot, and said rotating axle is disposed forwardly and upwardly of said actuating pin, and, in the projecting state, said actuating pin is engaged in said upper end portion of said rear slot, and said rotating axle is disposed rearwardly and upwardly of said actuating pin.

* * * * *